(12) United States Patent
Felsing et al.

(10) Patent No.: US 6,648,352 B2
(45) Date of Patent: Nov. 18, 2003

(54) SKID STEER LOADER SUSPENSION

(75) Inventors: Brian E. Felsing, Park Ridge, IL (US); Anthony J. Lamela, Gilberts, IL (US); Troy D. Bateman, Joilet, IL (US)

(73) Assignee: Case, LLC, Racine, WI (US)

( * ) Notice: Subject to any disclaimer, the term of this patent is extended or adjusted under 35 U.S.C. 154(b) by 126 days.

(21) Appl. No.: 10/027,351

(22) Filed: Dec. 26, 2001

(65) Prior Publication Data

US 2003/0116936 A1 Jun. 26, 2003

(51) Int. Cl.[7] ................................................ B60G 3/12
(52) U.S. Cl. ................................................ 280/124.128
(58) Field of Search .................. 280/124.128, 124.129, 280/124.13, 124.153, 124.166; 180/6.48, 308

(56) References Cited

U.S. PATENT DOCUMENTS

| 3,679,017 | A | * | 7/1972 | Roe .......................... 180/359 |
| 4,619,578 | A | * | 10/1986 | Routledge ................... 414/498 |
| 6,237,926 | B1 | * | 5/2001 | Pritchard et al. ..... 280/124.128 |
| 6,428,026 | B1 | * | 8/2002 | Smith .................. 280/124.128 |

* cited by examiner

*Primary Examiner*—Paul N. Dickson
*Assistant Examiner*—Faye M. Fleming
(74) *Attorney, Agent, or Firm*—Rebecca Henkel

(57) ABSTRACT

A skid steer loader has a chassis with spring-loaded suspensions that are pivotally coupled to the chassis closer to the center of gravity than the wheels. The suspensions include fore-and-aft extending swing arms that pivot about a lateral axis with respect to the chassis. A torsion spring such as a torsion bar is coupled to the control arm to provide torsional support for the suspension. The torsion spring is anchored to the chassis nearer the center of gravity than the point where the swing arm is coupled to the chassis.

34 Claims, 19 Drawing Sheets

SKID STEER LOADER SUSPENSION

FIELD OF THE INVENTION

The invention related generally to work vehicles, such as skid steer loaders and other skid steer vehicles. More particularly, it relates to drive and suspension systems for such vehicles.

BACKGROUND OF THE INVENTION

Skid steer vehicles such as skid steer loaders are used in a wide variety of construction environments where they are particularly suitable due to their small size and maneuverability.

Skid steer vehicles can turn with an effective turning radius of zero. They can rotate about a vertical axis extending through the center of the chassis by driving the wheels on one side of the vehicle forward and the wheels on the other side of the vehicle backwards. Since the wheels cannot be steered with respect to the chassis, this causes the wheels to skid sideways as they rotate. This is the extreme case. Even when the vehicle is moving forward or backward (i.e. the wheels on both sides of the vehicle are driven in the same direction) the vehicle still steers by skidding, albeit to a lesser degree.

Skid steer vehicles are well suited to work on construction sites and even within buildings due to this ability to skid steer. Enhancing this capability is their compact size.

Skid steer vehicles have not been provided with sprung suspensions for several reasons.

First, the addition of a suspension is difficult due to the compact size of the skid steer vehicle itself. Adding suspensions would increase the width of the vehicle and make it less suitable for the close spaces in which it is used.

Second, traditional automotive-type suspensions would cause excessive pitching of the work vehicle, given its short wheelbase (e.g. vehicles having a front-to-rear wheel spacing of less than two wheel diameters). For example, a typically automotive or truck type suspension includes a vertically oriented spring that is coupled to the chassis at its upper end. The point of coupling is typically directly above the rotational axis of the wheel supported on that suspension. As a result, whenever the wheel is forced upward, (such as when the car goes over a bump) the spring is compressed, and an upward force is applied to the chassis directly above the wheel where the spring is anchored.

For a vehicle such as a car with a large wheel-to-wheel spacing (i.e. a fore-and-aft wheel spacing of six wheel diameters or more) and a long wheelbase, this upward force does not cause significant pitching in the vehicle. For a vehicle such as a skid steer loader, with its small wheel-to-wheel spacing (i.e. a fore-and-aft wheel spacing of less than two wheel diameter) and short wheelbase, the pitching would be more severe.

What is needed therefore is a suspension system for a skid steer loader that provides springing, but avoids or reduces the pitching inherent in a short wheelbase vehicle having a spring coupled to the chassis adjacent the wheel. It is an object of this invention to provide such a vehicle.

SUMMARY OF THE INVENTION

In accordance with a first embodiment of the invention a skid steer vehicle is provided that includes a chassis having a left side and a right side; an engine fixed to the chassis; a first hydraulic fluid pump driven by the engine to provide hydraulic fluid under pressure; a second hydraulic fluid pump driven by the engine to provide hydraulic fluid under pressure; at least a first hydraulic motor in fluid communication with the first hydraulic fluid pump; at least a second hydraulic motor in fluid communication with the second hydraulic fluid pump; left front and left rear suspensions mounted in a fore-and-aft arrangement on the left side of the chassis for pivotal movement with respect thereto, each left suspension including a left ground-engaging wheel extending from the left side of the chassis and rotationally coupled to the at least a first hydraulic motor to be driven in rotation thereby, a left control arm assembly coupled to and between the left wheel and the chassis to pivot with respect to the chassis about a left control arm pivotal axis; and right front and right rear suspensions mounted in a fore-and-aft arrangement on the right side of the chassis for pivotal movement with respect thereto, each right suspension including a right ground-engaging wheel extending from the right side of the chassis and rotationally coupled to the at least a second hydraulic motor to be driven in rotation thereby, a right control arm coupled to and between the right wheel and the chassis to pivot with respect to the chassis about a right control arm pivotal axis, wherein said at least a first hydraulic motor is coupled to both of the left side suspension wheels to drive the left side wheels at the same speed, and wherein said at least a second hydraulic motor is coupled to both of the right side suspension wheels to drive the right side wheels at the same speed.

Each of the control arms of the left side suspensions and the right side suspensions may be pivotally coupled to the chassis about a pivotal axis that is disposed closer to the center of gravity of the vehicle than wheel coupled to said each control arm. The left control arm pivotal axis of the left front suspension and the right control arm pivotal axis of the right front suspension may extend laterally with respect to the chassis and may be located behind and parallel to the rotational axis of the left front and right front wheels, respectively. The left front suspension may further include a left front spring coupled to the left front control arm at the left front control arms' pivotal axis to apply a torsional force thereto, wherein the left front spring is coupled to the chassis at a position closer to the center of gravity of the vehicle than the left front control arm; and a right front spring coupled to the right front control arm at the right front control arms' pivotal axis to apply a torsional force thereto, wherein the right front spring is coupled to the chassis at a position closer to the center of gravity of the vehicle than the left front control arm. The left front spring and the right front spring may be torsion bars extending laterally with respect to the chassis and behind the rotational axes of the left front suspension wheel and the right front suspension wheel. The left rear suspension may further include a left rear spring coupled to the left rear control arm at the left rear control arms' pivotal axis to apply a torsional force thereto. The left rear spring may be coupled to the chassis at a position closer to the center of gravity of the vehicle than the left rear control arm. A right rear spring may be coupled to the right rear control arm at the right rear control arms' pivotal axis to apply a torsional force thereto. The right rear spring may be coupled to the chassis at a position closer to the center of gravity of the vehicle than the left rear control arm.

In accordance with a second embodiment of the invention, a skid steer vehicle is provided that includes a chassis having a left side and a right side; an engine mounted on the chassis; first and second hydraulic pumps driven by the engine to provide first and second sources of hydraulic fluid under pressure; four independent suspensions coupled to the chassis, each suspension including a torsion bar having a longitudinal axis, a fixed end and a free end, wherein the fixed end is fixed with respect to the chassis, a control arm having first and second ends, wherein the first end is mounted to the chassis to pivot with respect to the chassis and further wherein the free end of the torsion bar is fixed to the first end of the control arm to pivot with respect to the chassis and thereby applying a torsional load to the torsion bar, a ground-engaging wheel rotationally mounted on the second end of the control arm to rotate with respect thereto, and a hydraulic motor fixed to the second end of the control arm and also coupled to the wheel to rotate the wheel with respect to the control arm.

Two of the four suspensions may be front suspensions, disposed one on each side of the chassis. Two of the four suspensions may be rear suspensions disposed one on each side of the chassis. The control arms of the two front suspensions may be coupled to the chassis on either side of the chassis in a central region thereof and may extend forward toward the front of the vehicle. The control arms of the two rear suspensions may be coupled to the chassis on either side of the chassis in the central region thereof and extend backward toward the rear of the vehicle. The longitudinal axes of the torsion bars of the front suspensions may be generally parallel and coaxial and the longitudinal axes of torsion bars of the rear suspensions may be generally are generally parallel and coaxial. The torsion bar of each of the two front suspensions may be fixed to the chassis at a point rearward of the rotational axis of its associated wheel, and the torsion bar of each of the two rear suspensions may be fixed to the chassis at a point forward of the rotational axis of its associated wheel. Each suspension may further include a reduction gear wheel hub that is mounted to the second end of the control arm and to which the wheel is fixed, the wheel hub being coupled to and driven by the hydraulic motor and including an integral reduction gear set to rotate the wheel at a velocity less than the rotational velocity of the hydraulic motor. The control arm of each of the suspensions may include at least two spaced apart steel plates extending generally perpendicular to the ground and defining a space therebetween in which the hydraulic motor is received and supported. The first hydraulic pump may be hydraulically connected to the two hydraulic motors of the suspensions disposed on the left side of the chassis in a first series circuit and the second hydraulic pump may be hydraulically connected to the two hydraulic motors of the suspensions disposed on the right side of the chassis in a second series circuit.

In accordance with a third embodiment of the invention, a skid steer vehicle is provided that includes a chassis having a left side and a right side; an engine mounted on the chassis; two independent suspensions disposed at the front of the vehicle, one on the left side of the chassis and one on the right side of the chassis, the front suspensions including a fore-and-aft oriented forward control arm that is pivotally coupled to the vehicle at an after end of the forward control arm, a ground-engaging forward wheel coupled to a forward end of the forward control arm and having a rotational axis about which the forward wheel rotates to convey the vehicle over the ground, and a forward torsion bar that is coupled to the after end of the forward control arm at a location rearward of the rotational axis of the forward wheel, the torsion bar extending laterally inward from the forward control arm generally toward the center of the vehicle to a forward suspension anchor point at which it is fixed to the chassis of the vehicle, wherein the forward suspensions anchor point is located to the rear of the forward wheel's rotational axis and laterally inward from the forward wheel itself; and two independent suspensions disposed at the rear of the vehicle, one on the left side of the chassis and one on the right side of the chassis, the rear suspensions including~a fore-and-aft oriented rear control arm that is pivotally coupled to the vehicle at a forward end of the rear control arm, a ground-engaging rear wheel coupled to a rearward end of the rear control arm and having a rotational axis about which the rear wheel rotates to convey the vehicle over the ground, and a torsion bar that is coupled to the forward end of the rear control arm at a location forward of the rotational axis of the rear wheel, the torsion bar extending laterally inward from the rear control arm generally toward the center of the vehicle to a rear suspension anchor point at which it is fixed to the chassis of the vehicle, wherein the rear suspension anchor point is located forward of the rear wheel's rotational axis and laterally inward from the rear wheel itself.

Each torsion bar of the four suspensions may extend generally perpendicular to the longitudinal extent of the control arm to which it is coupled. Each of the four control arms may extend horizontally. The center of each wheel may be at the same height above the ground as the pivot point of the control arm to which it is coupled when the vehicle is stationary. Each control arm may include a pair of spaced-apart steel plates, each plate extending both in a vertical direction and in a fore-and aft direction. Each of the two front independent suspensions may include a fluid-filled shock-absorbing element that is coupled to and between the forward end of each suspension's control arm and the chassis. Each of the two rear independent suspensions may include a fluid-filled shock-absorbing element that is coupled to and between the rearward end of each suspension's control arm and the chassis. Each of the two front independent suspensions may include a hydraulic motor that is fixed to the forward end of the control arm of said each front suspension. Each of the two rear independent suspensions may include a hydraulic motor that is fixed to the rear end of the control arm of said each rear suspension.

In accordance with a fourth embodiment of the invention, a skid steer vehicle is provided including a chassis having a left side, a right side, and a center of gravity; an internal combustion engine mounted on the chassis; and left and right front suspensions pivotally coupled to and extending from the left and right sides of the chassis, respectively, wherein each front suspension includes a front wheel; a front control arm coupled to the front wheel, and pivotally coupled to the chassis at at least one pivot point defining a control arm to chassis pivotal axis, wherein the pivotal axis is disposed between the center of gravity of the vehicle and the front wheel, and a spring element coupled to and between the front control arm and the chassis to apply a torque to the front control arm, the spring element being fixed to the chassis at a point closer to the center of gravity of the vehicle than the pivot point of the front control arm.

The control arm to chassis pivotal axes may extend laterally with respect to the chassis. The spring element may be a torsion bar and may be coaxial with the front control arm to chassis pivotal axis. The front control arm may be an elongate member extending fore-and-aft with respect to the chassis. The front control arm may have a forward end and an after end, the forward end coupled to the front wheel and the after end pivotally coupled to the chassis. The front wheel may be coupled to the forward end of the front control arm to rotate with respect to the front control arm. The skid steer vehicle may further include a first hydraulic pump coupled to the engine to provide hydraulic fluid under pressure; at least one hydraulic motor coupled to the first pump and to the left front wheel to rotate the left front wheel; a second hydraulic pump coupled to the engine to provide hydraulic fluid under pressure; at least a second hydraulic motor coupled to the second pump and to the right front wheel to rotate the right front wheel. It may also include left and right rear suspensions pivotally coupled to and extending from the left and right sides of the chassis, respectively, wherein each rear suspension includes a rear wheel and a rear control arm coupled to the wheel, and pivotally coupled to the chassis at at least one pivot point defining a control arm to chassis pivotal axis, wherein the pivotal axis is disposed between the center of gravity of the vehicle and the rear wheel, and wherein the at least one hydraulic motor is coupled to the left rear wheel to rotate the left rear wheel at the same velocity as it rotates the left front wheel, and wherein the at least a second hydraulic motor is coupled to the right rear wheel to rotate the right rear wheel at the same velocity as it rotates the right front wheel. Each rear suspension may include a spring element coupled to and between the rear control arm and the chassis to apply a torque to the control arm, the spring element being fixed to the chassis at a point closer to the center of gravity of the vehicle than the pivot point of the rear control arm. The center of gravity may be determined with the vehicle unloaded.

DETAILED DESCRIPTION OF THE DRAWINGS

Figure 14:
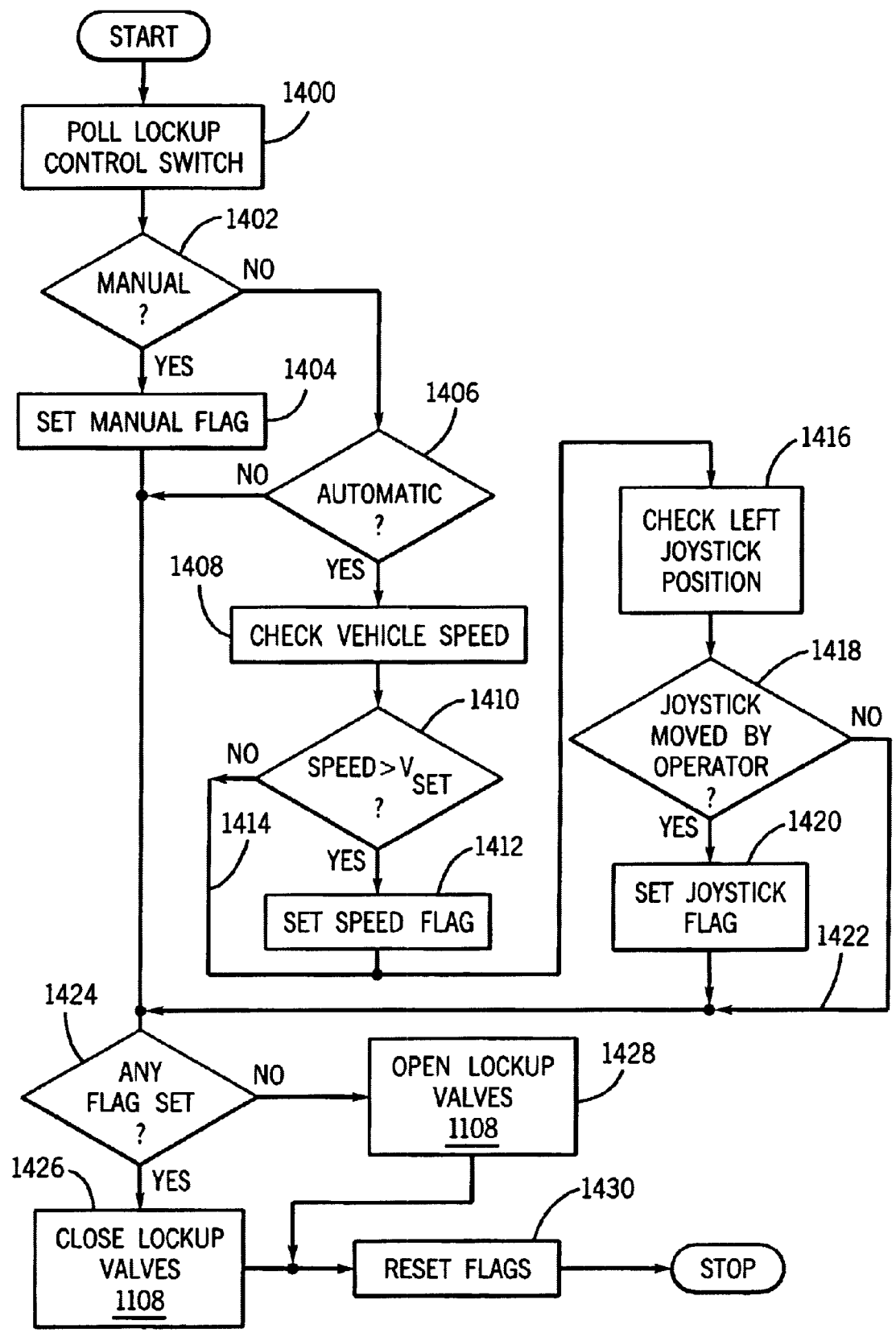
Figure 15:
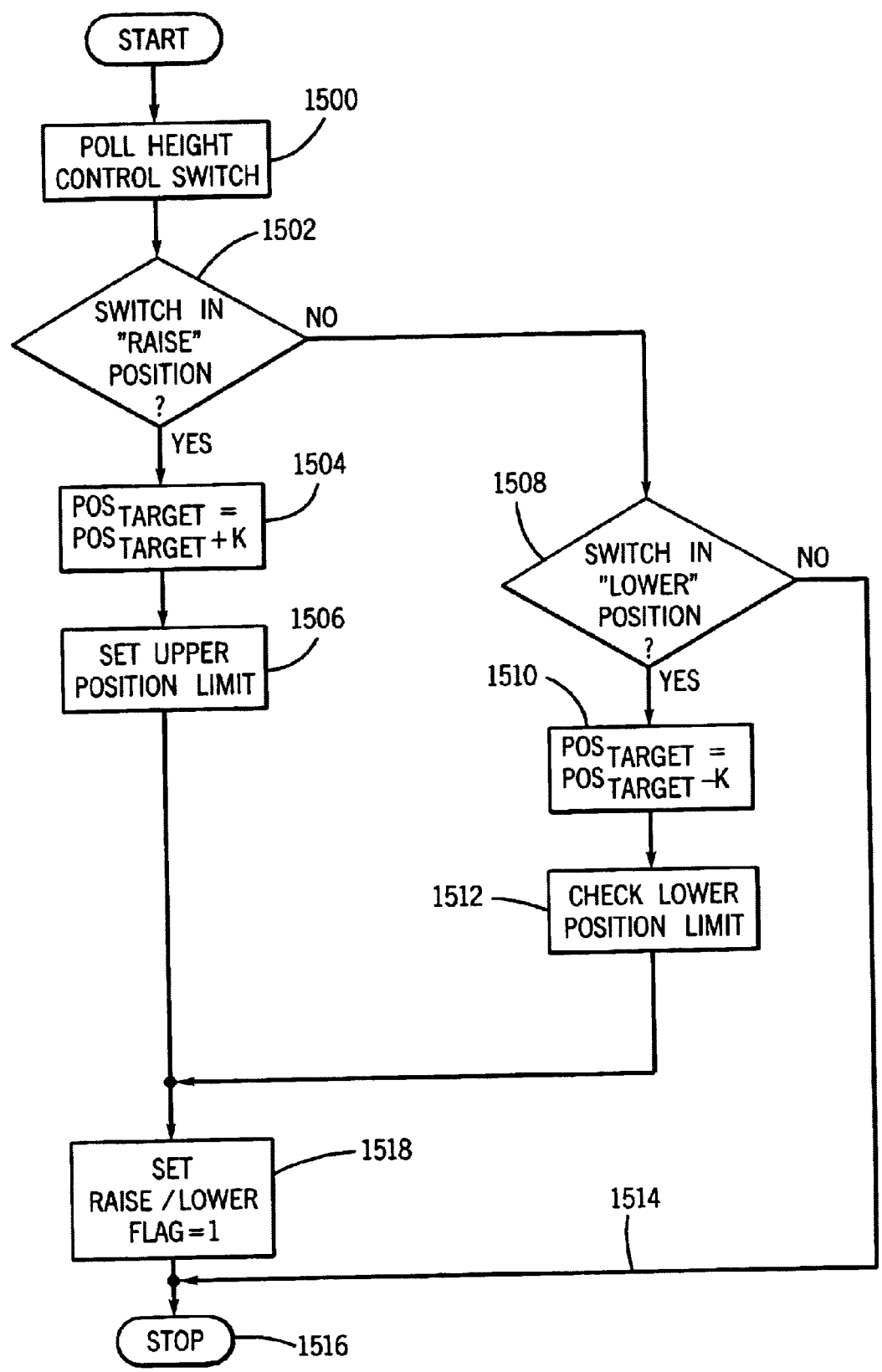
Figure 16:
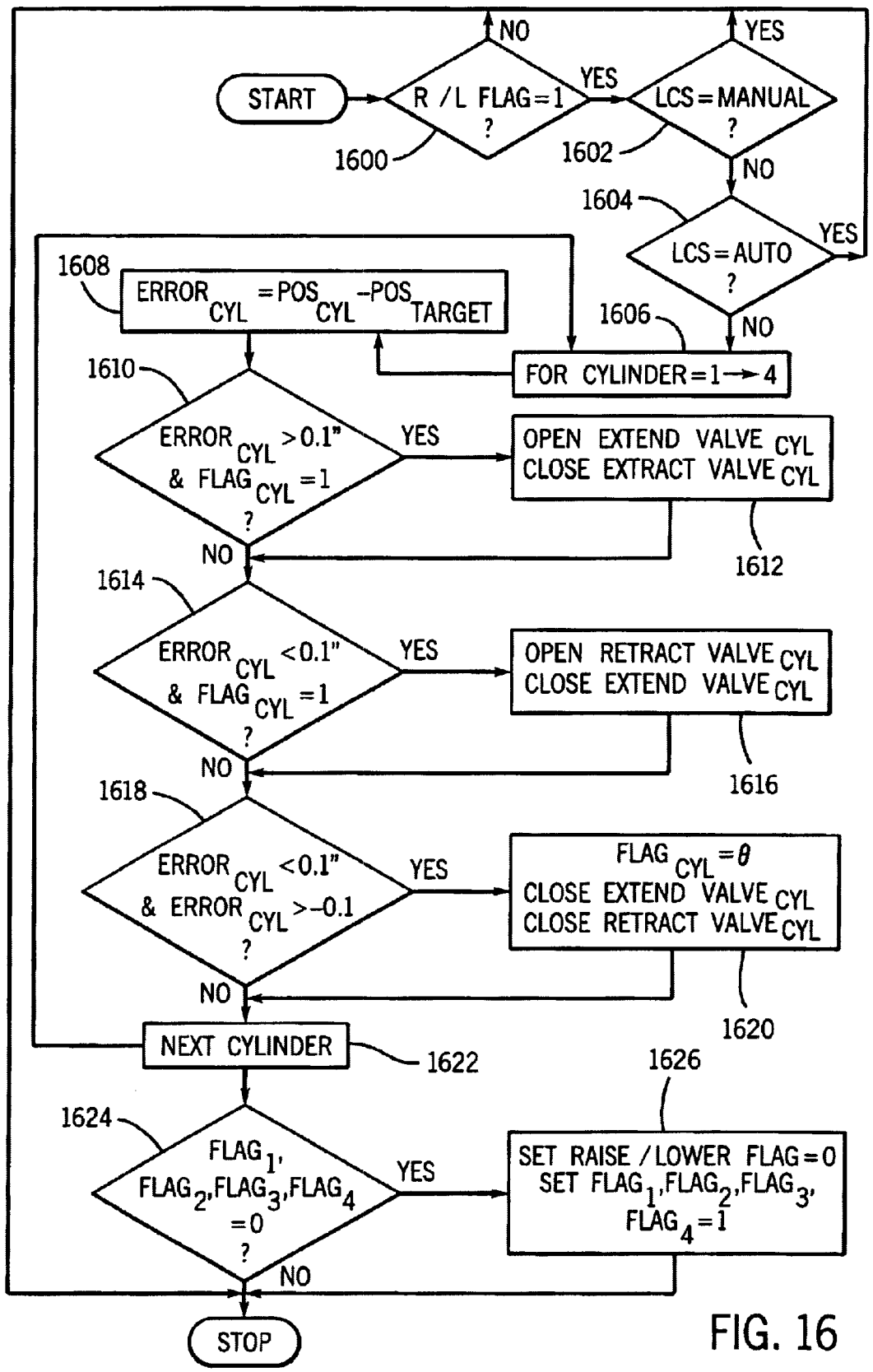
Figure 17:
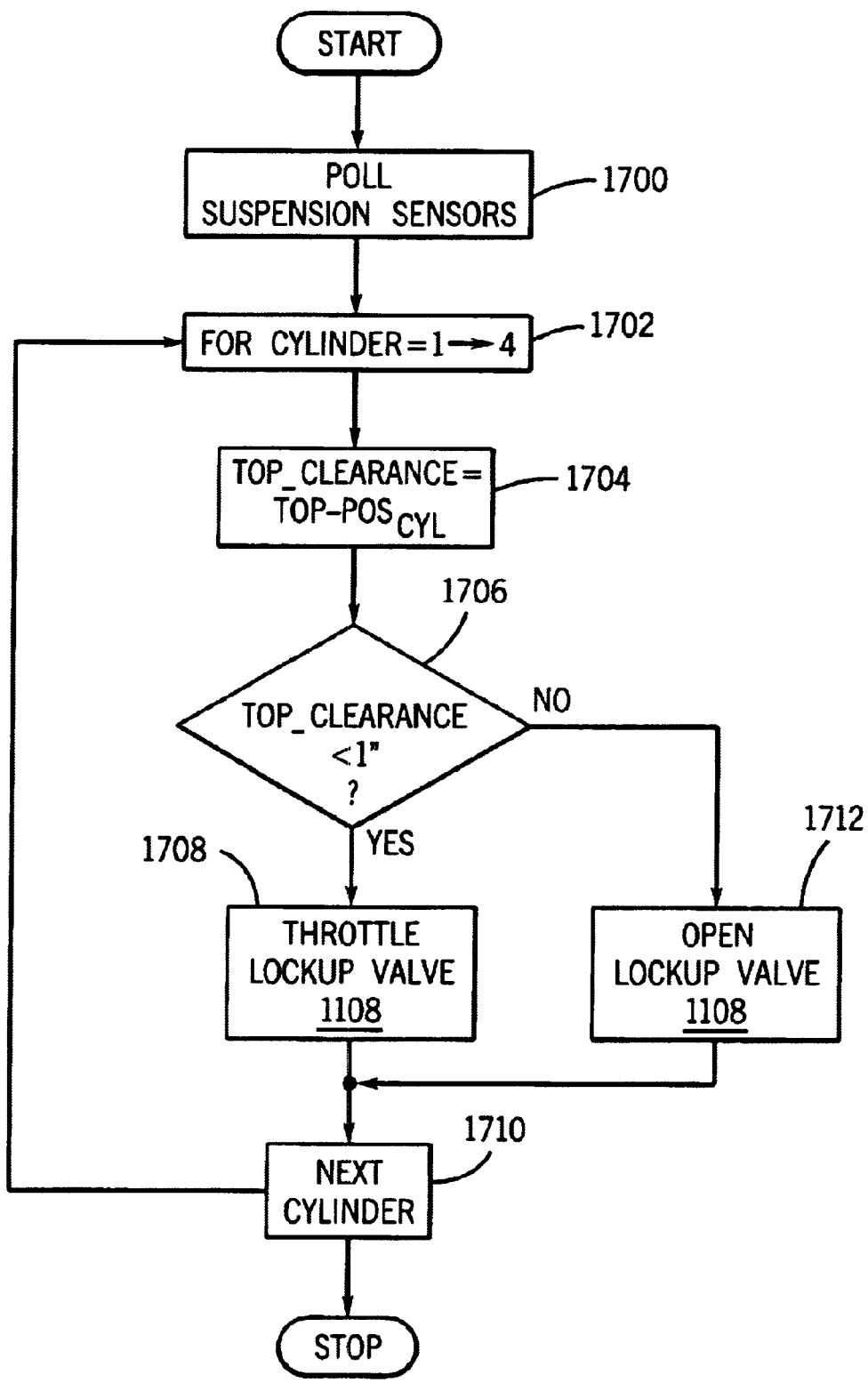
Figure 18:
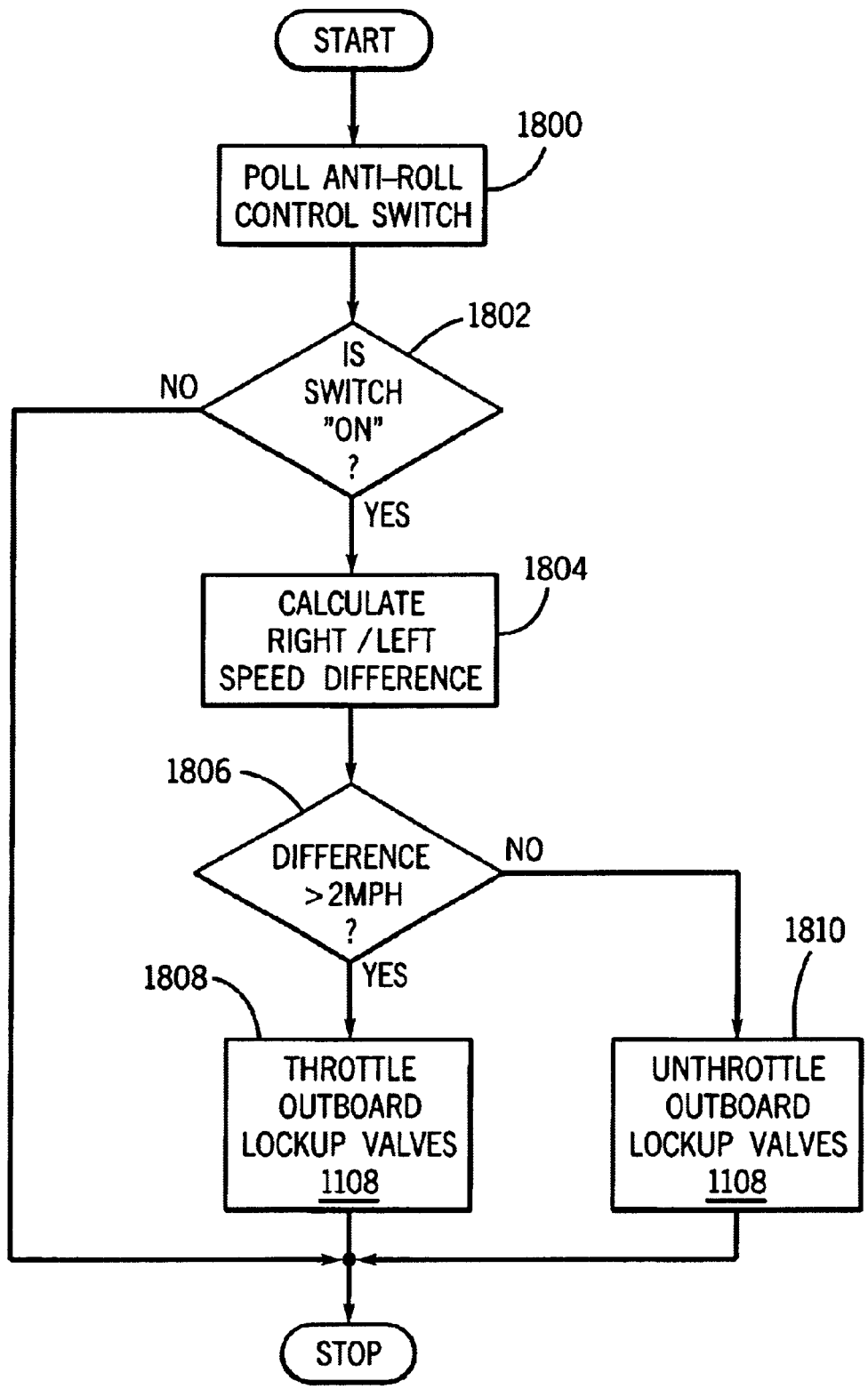
Figure 19:
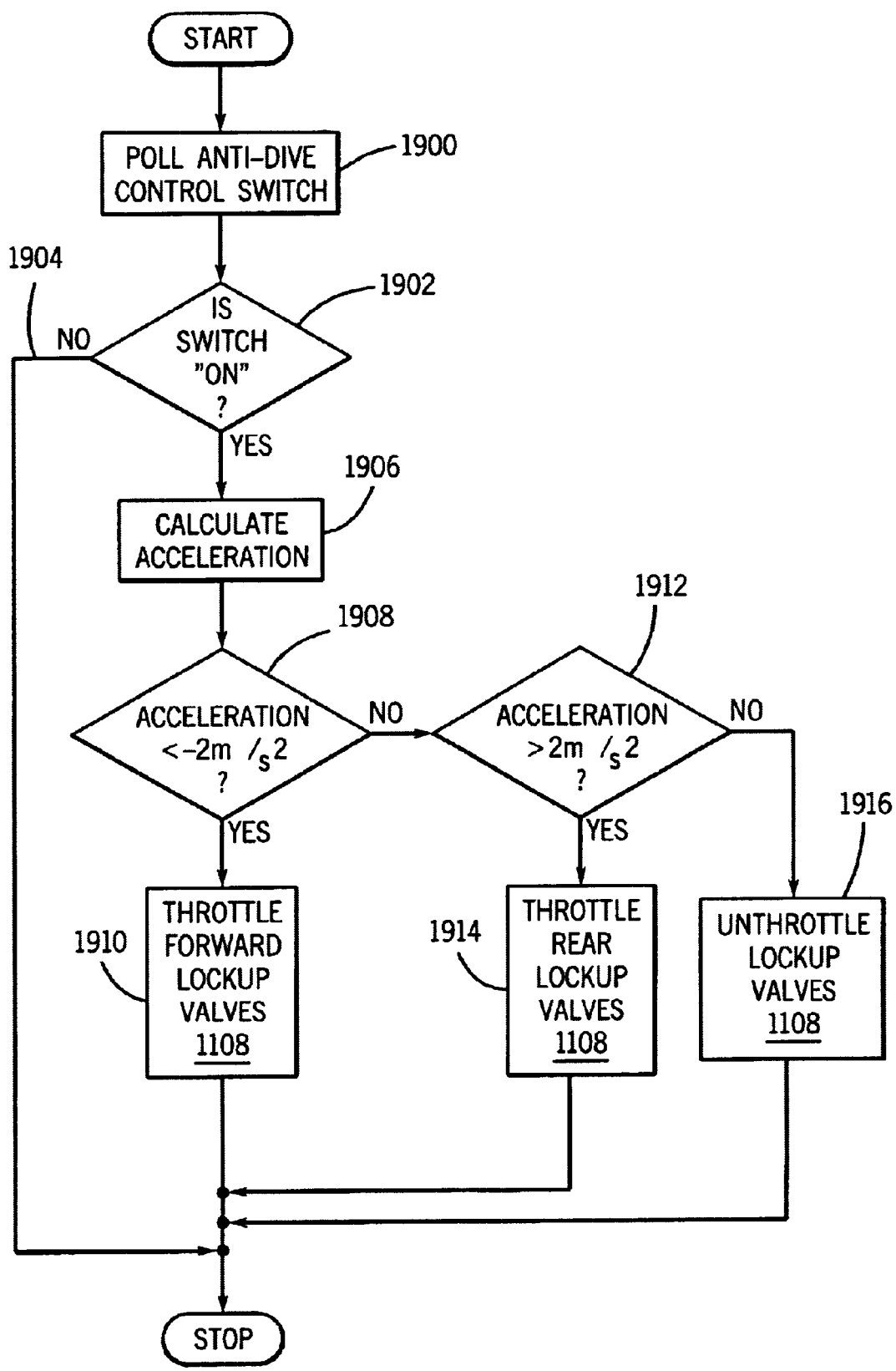

FIG. 14 is a flow chart illustrating the programmed operation of the suspension controller when it locks up the suspensions of the vehicle based on the occurrence of any of three independent conditions: (i) vehicle speed falling below a threshold value, (ii) operator manipulation of an input device that controls the loader arms and/or bucket, and (iii) operator manipulation of a dedicated manual suspension locking switch that is located on one of the joysticks thereby permitting the operator to lock the suspensions on demand while manipulating the joystick with the same hand to perform some other function;

FIG. 15 is a flow chart illustrating the programmed operation of the suspension controller in response to the operator manipulating a height control switch that sets the target height or position of the vehicle and its suspensions;

FIG. 16 is a flow chart illustrating the programmed operation of the suspension controller to execute a one-time change in vehicle ride height in response to operator manipulation of the height control switch as shown in FIG. 15;

FIG. 17 is a flow chart illustrating the programmed operation of the suspension controller when it throttles (partial or total) the suspension lockup valves based on the swing arms of the suspensions approaching their upper limits of travel, thereby reducing the likelihood that the swing arms will bang up against the chassis;

FIG. 18 is a flow chart of the programmed operation of the suspension controller when it automatically reduces rolling by throttling (partial or total) suspension lockup valves in response to operator manipulation of an anti-roll control switch and in response to signals indicative of lateral acceleration exceeding a lateral acceleration threshold; and FIG. 19 is a flow chart of the programmed operation of the suspension controller when it automatically reduces diving by throttling (partial or total) suspension lockup valves in response to operator manipulation of an anti-dive control switch and in response to signals indicative of longitudinal acceleration exceeding a longitudinal acceleration threshold.

DETAILED DESCRIPTION OF THE PREFERRED EMBODIMENT

Figure 1:
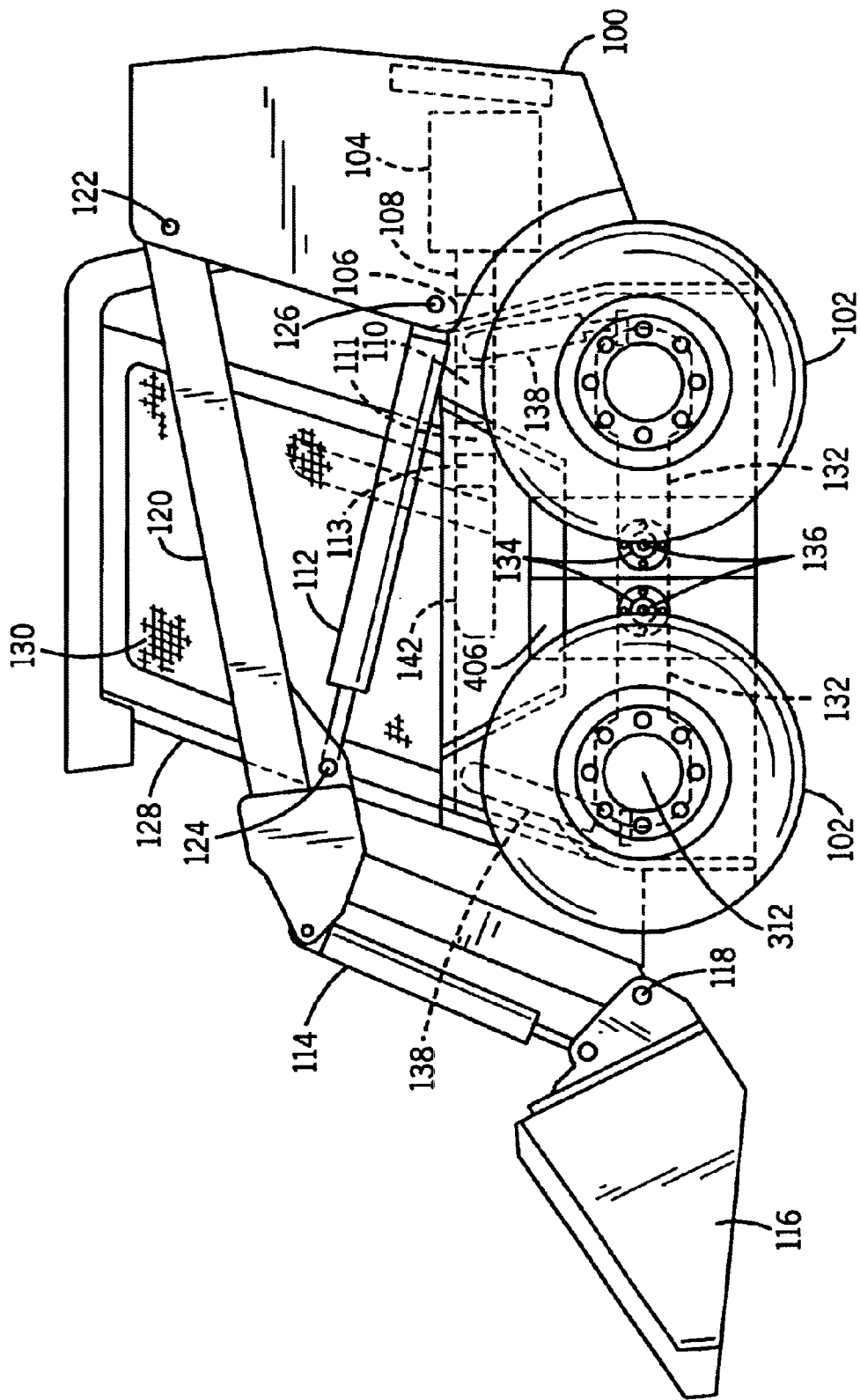
FIG. 1 is a side view of a skid steer vehicle in accordance with the present invention.
Figure 2:
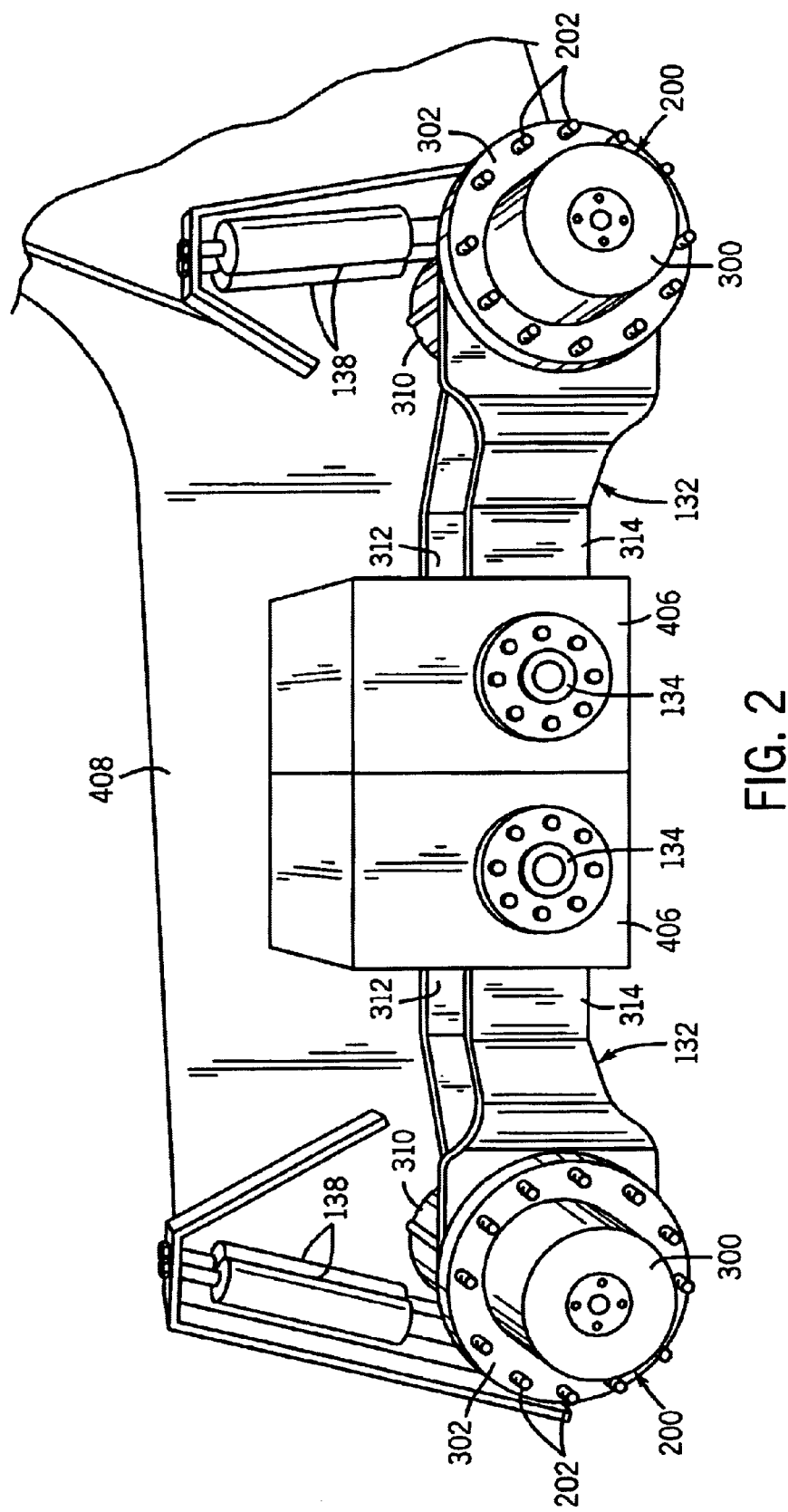
FIG. 2 is a partial cutaway side view of the skid steer vehicle with wheels removed.

FIGS. 1 and 2 are side views of a typical skid steer loader having a sprung suspension system in accordance with the present invention. FIG. 1 shows the loader with wheels. FIG. 2 shows the loader without wheels. The loader includes a chassis 100 to which four wheels 102 are connected, two on each side. In FIG. 1, only two wheels are shown. There are two wheels in identical position on the other side of the vehicle. An internal combustion engine 104 is coupled to and drives five hydraulic pumps 106, 108, 110, 111, and 113. Pumps 106 and 108 provide hydraulic fluid to the motors (not shown) that turn wheels 102.

Hydraulic pump 110 is provided as a source of pressurized hydraulic fluid that is applied to loader arm lift cylinders 112. Cylinders 112 are coupled to and between the skid steer loader's chassis and the loader arms to lift the loader arms with respect to the vehicle. There are two loader arms, one disposed on each side of the chassis 100.

Pump 110 also provides pressurized hydraulic fluid to bucket cylinders 114 which are coupled to and between the loader arms and bucket 116 to tilt the bucket with respect to the loader arms.

Hydraulic pump 111 is called a "charge pump" and provides pressurized hydraulic fluid to the drive motor circuit which is described in more detail below in conjunction with FIG. 9 to make up for fluid that leaks or is otherwise released from that circuit. It is preferably a fixed displacement pump, although it may be a variable displacement pump.

Hydraulic pump 113 provides pressurized hydraulic fluid to suspension components and is discussed below in more detail in conjunction with FIG. 11. It is preferably a fixed displacement pump, although it may be a variable displacement pump.

Bucket 116 is pivotally coupled to loader arms 120 at pivot joints 118. It pivots about a substantially horizontal axis with respect to the loader arms when cylinder 114 is retracted or extended.

In a similar fashion, loader arms 120 are pivotally coupled to chassis 100 at pivot joints 122 such that the loader arms raise and lower whenever the cylinders 112 extend and retract, respectively. Cylinders 112 are pivotally coupled both to the loader arms and to the chassis at pivot joints 124 and 126, respectively.

A heavy-duty cage 128 called a ROPS extends about the operator's compartment 130 and prevents the operator from being injured in the event of a roll over or material falling from the bucket when it is raised.

Each wheel 102 is supported at one end of control arm 132, also called a "swing arm". The other end of the swing arm is connected to chassis 100 by a pair of spherical bearings 134. These two spherical bearings are spaced apart and thus prevent the swing arm from twisting with respect to the vehicle. Each wheel 102 is bolted to a wheel hub 200 by a plurality of bolts 202.

The pair of spherical bearings supporting the swing arm define a pivotal axis 136 that extends laterally with respect to chassis 100 of the loader and sets the alignment of the wheel. These pivotal axes are the axes about which swing arms 132 pivot with respect to the vehicle.

Each swing arm is damped by a pair of hydraulic cylinders 138 that are coupled at their lower ends to the swing arm and at their upper ends to chassis 100. These cylinders are fluid-filled using hydraulic fluid, gas or a combination of the two. They may be self-contained shock absorbers, or may include one or more external connections to a separate supply of hydraulic fluid and/or gas. They may have a single connection, such as a connection to a pressurized hydraulic accumulator or gas charged reservoir, or they may have multiple connections. While the embodiment shown here illustrates two such hydraulic cylinders, one or more such cylinders may be preferred. Whenever swing arms 132 pivot about pivotal axes 136 with respect to chassis 100, hydraulic cylinders 138 damp the motion of the swing arms.

Engine 104 is preferably a two to six cylinder internal combustion engine, preferably a diesel engine, and is disposed such that its crankshaft extends longitudinally with respect to the longitudinal extent of chassis 100.

Pumps 106, 108, 110, 111 and 113 are connected together in series and include shafts that rotate about a common axis. In this embodiment, the pump shafts are rotationally coupled to the crankshaft of engine 104 and rotate about the same axis of rotation about which the crankshaft rotates. While this is the preferred embodiment, one or more of the pump shafts may be in parallel with one or more of the other pump shafts.

Pumps 106, 108, and 110 are located underneath or behind operator seat 142 in operator's compartment 130. This provides for a short wheelbase and narrow width over wheels. Operator's seat 142 is located forward of the lift arm pivots 122 such that the lift arms are raised and lowered on either side of the operator.

Figure 3:
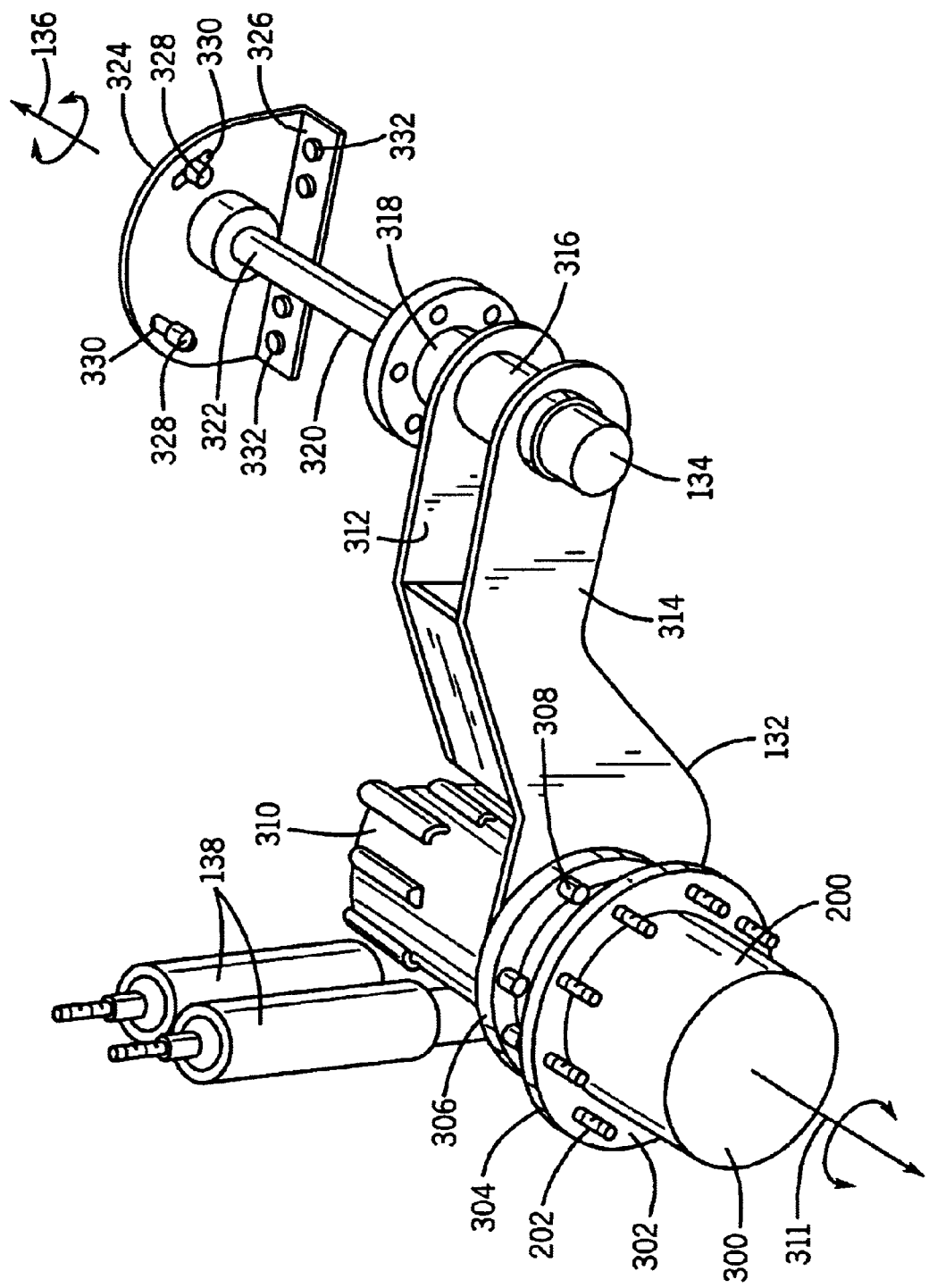
FIG. 3 is a is a perspective view of the mechanical suspension components of a suspension of the skid steer vehicle.

FIG. 3 is a perspective view of the forward left and rear right suspension showing additional details of their construction. Wheel hub 200 includes a gear box 300 in which the planetary gears are enclosed. A flange 302 is fixed to and extends outward from this gearbox to provide a mounting surface against which wheels 102 can be mounted. Several bolts 202 extend outward from flange 302 to receive mating holes on wheel 102. Once bolts 202 are inserted through these holes, nuts are threaded on the free end of the bolts to prevent the wheel from coming off the hub. Wheel hub 200 also includes a stationary mounting flange 306 that is fixed to swing arm 132 by bolts 308.

Flange 306 is fixed to swing arm 132 and receives the weight of the vehicle through the swing arms. It transmits the weight through bearings inside wheel hub 200 to gear box 300 and flange 302, which transmit the weight of the loaded vehicle to the wheels.

A hydrostatic motor 310 is bolted to the stationary portion of wheel hub 200 and drives wheel hub 200 by its central rotating output shaft. It is this output shaft that engages the gears in gear box 300 and causes gear box 300 and flange 302 to rotate at a reduced speed. Since the wheel is fixed to flange 302 this reduced speed is also the speed of the wheel. In order to provide such a compact motor 310, the planetary gears inside gear box 300 are arranged to reduce the speed of the motor shaft by a factor determined by the engine speed, the hydraulic pump and motor sizes that are chosen to achieve the desired torque and speed characteristics for the vehicle.

Both hydrostatic motor 310 and flange 302 of wheel hub 200 preferably rotate about the same rotational axis 312. Rotational axis 311 is preferably parallel to pivotal axis 136.

Swing arm 132 is formed from a pair of steel plates 312 and 314. At the vehicle end of the swing arm these plates are welded to a cylindrical support 316, which extends through and is welded to both of plates 312 and 314. Cylindrical support 316 is coupled to two spherical bearings: an outboard spherical bearing 134 and an inboard spherical bearing 318. These spherical bearings support cylindrical support 316 and are permitted to rotate about the axis of the bearings, which define axis 136 of the suspension.

Plate 312 is generally planar and extends between cylindrical support 316 and the free end of hydrostatic motor 310. Plate 314 includes an "S"-shaped bend extending away from the vehicle and thereby providing a space between the two plates sufficient to mount hydrostatic motor 310. In addition, the bend in plate 314 permits it to extend outward into a cavity within the periphery of rim 400 (FIG. 4) of wheel 102. This permits wheel 102 to extend inwards and encompass portion 402 of plate 314. By providing the "S"-shaped bend in plate 314, wheel 102 can be spaced closer to the vehicle, and thus the narrow width over wheels of the skid steer loader can be better preserved.

A torsion spring or bar 320 is coupled to the inside of cylindrical support 316 on its outboard end. Its inboard end 322 is fixed to a flange 324 that rotates together with the inboard end of torsion bar 320. This flange, in turn, is supported by L-shaped bracket 326 by bolts 328 that extend through slots 330 in L-shaped bracket 326. Bolts 332 fix bracket 326 to the floor pan of the loader's chassis. The load on torsion bar 320 can be changed by loosening bolts 328 and rotating flange 324 with respect to bracket 326. As it is rotated, bolts 328 will slide back and forth in their respective slots. Once the torsion bar is in the proper position to support the vehicle at its proper height, bolts 328 can be tightened thereby fixing flange 324 to L-shaped bracket 326.

Figure 4:
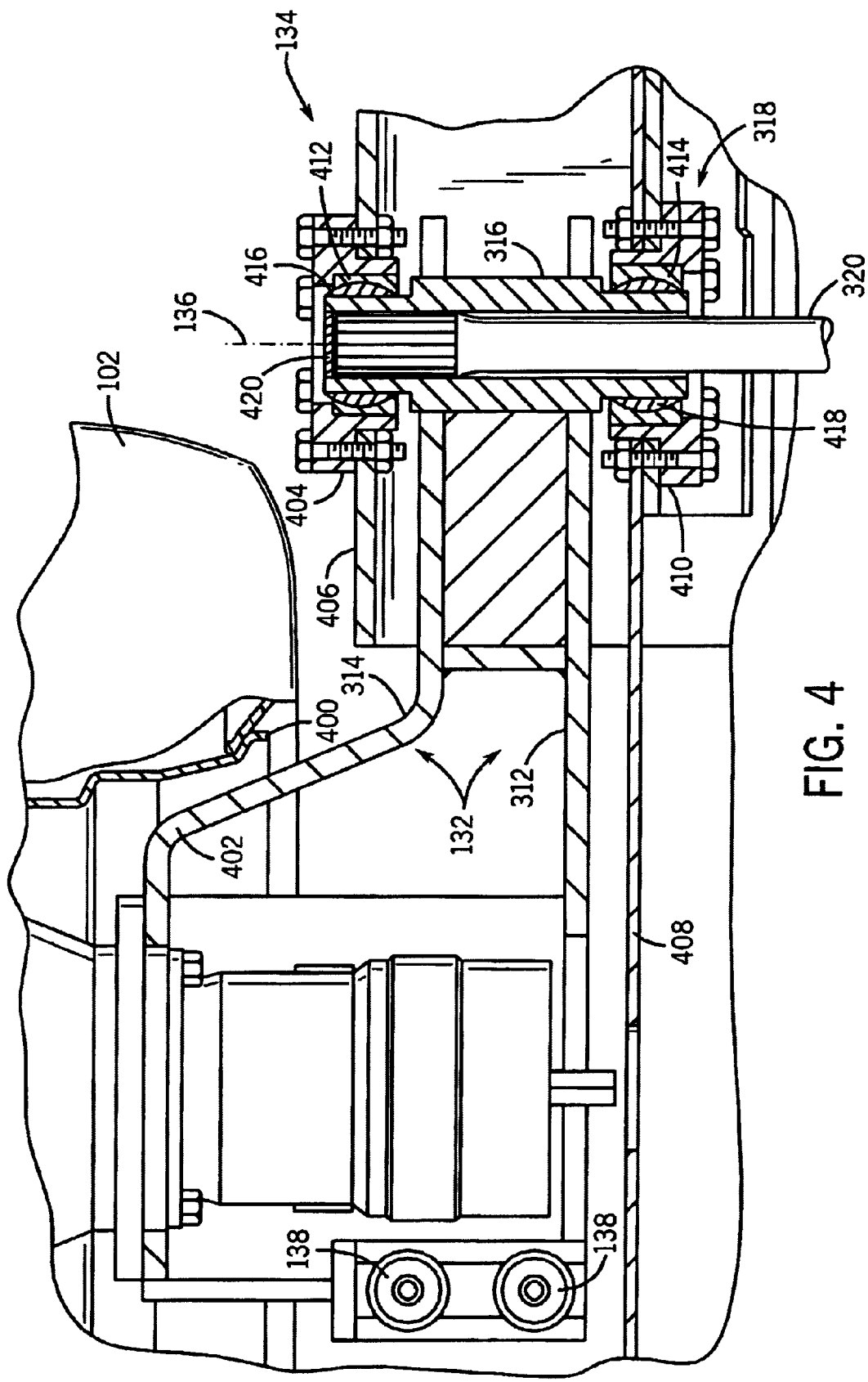
FIG. 4 is a fragmentary top view of the skid steer vehicle showing a single suspension control arm that is cut partially away by a plane parallel to the ground and passing through a centerline defined by the torsion bar of that suspension.

FIG. 4 is a top view of the suspension shown in FIG. 3 in partial cross section. Outboard spherical bearing 134 is preferably a cheek block bearing having an outwardly extending flange 404 that is bolted to downwardly extending bracket 406 which is bolted or welded to the side wall 408 of chassis 100. Spherical bearing 318 is also a cheek block type bearing and has a similar flange 410 extending outwardly that is fixed to sidewall 408 of chassis 100. Flanges 404 and 410 support respective spherical outer bearing races 412 and 414. The outer bearing races mate with spherical inner bearing races 416 and 418. Inner races 416 and 418 pivot with respect to outer bearing races 412 and 414 to permit the suspension to pivot up and down with respect to pivotal axis 136. Inner bearing races 416 and 418 are mounted on opposing ends of cylindrical support 316 and are fixed thereto. Torsion bar or rod 320 extends through the hollow interior of cylindrical support 316 and engages splined inner surface 420 of cylindrical support 316. Torsion bar 320 is configured to have outwardly-facing splines to mate with the inwardly facing splines on splined inner surface 420. This arrangement transmits the torsional load from the suspension of FIG. 4 to torsion bar 320. This torsional load is resisted by "L"-shaped bracket 326 at the other end of the torsion rod located near the center of the vehicle, which transfers it to the floor pan of chassis 100. In this manner, when a load is placed upon the wheels, the wheels pivot the swing arms 132 upward twisting the torsion bar until the weight of the loader is completely supported on the wheels.

These minor amendments are being made to correct typographical errors and to place the application in better condition for allowance. Should the Examiner believe that anything further would be desirable in order to place this application in better condition for allowance, the Examiner is invited to contact Applicants' undersigned representative at the telephone number listed below.

Figure 5:
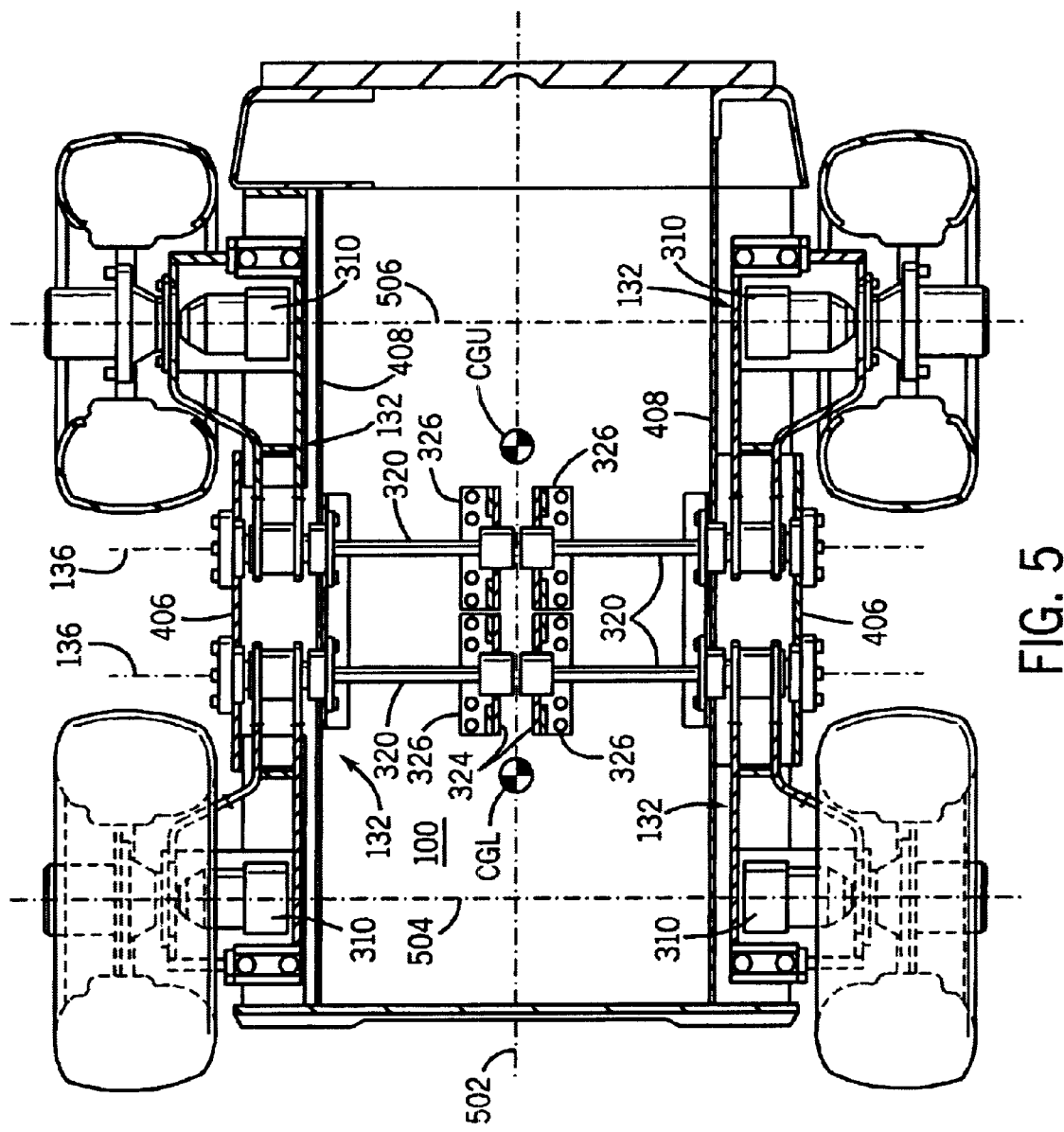
FIG. 5 is a top view of the vehicle of the skid steer vehicle in partial cross section showing the central anchoring arrangement of each of the torsion springs.

In FIG. 5, all four suspensions are illustrated. The four torsion bars 320 extend laterally (side to side) with respect to the front loader. The two front torsion bars (the two torsion bars on the left in FIG. 5) are co-axial. They share a common rotational axis 136 about which both swing arms pivot with respect to the chassis 100. Torsion bars 320 associated with the rear suspensions (the two torsion bars on the right in FIG. 5) are similarly co-axial, sharing a common rotational axis 136 about which the rear swing arms pivot.

Each torsion bar extends from the suspension whose wheel it supports inward almost to the centerline 502 of the loader. Centerline 502 extends the length of the vehicle and is equidistantly spaced from each opposed sidewall 408 of chassis 100. Swing arms 132 for the front wheels (the wheels located on the left side of FIG. 5) locate the wheels and hydraulic motors such that they rotate about a common rotational axis 504 when the forward swing arms are in the same pivotal position with respect to chassis 100.

In a similar manner, swing arms 132 for the rear wheels (the wheels located on the right side of FIG. 5) locate the rear wheels and hydraulic motors such that they also rotate about a common rotational axis 506 when the rear swing arms are in the same pivotal position with respect to the chassis 100. It should be recognized, of course, that when the suspensions on either side of the vehicle flex up or down with respect to the suspensions on the other side of the vehicle, the swing arms will be flexed away from this co-axial relationship. However, when the vehicle is stationary and the swing arms are in the same pivotal position with respect to chassis 100, they are co-axial.

FIG. 5 also illustrates another beneficial feature of the skid steer loader. The swing arms 132 for the front wheels extend from axis 136 (where they are coupled to the chassis) forward towards the front of the vehicle. In a similar fashion, the swing arms 132 that support the rear tires extend from their central pivot point and support point along axis 136 (where they are coupled to the chassis) towards the rear of the vehicle. This arrangement disposes the larger suspension components and mounting points inwardly, away from the ends of the vehicle. Thus, the front wheels and swing arms 132 are pivoted about an axis 136 located behind the rotational axis 504 of the wheels mounted on those swing arms. In a similar fashion, the rear wheels of the vehicle and their swing arms 132 pivot about a rotational axis 136 that is located ahead of the rotational axis 506 of the wheels on those swing arms.

The arrangement of FIG. 5 also illustrates another advantage of the suspension system. Each control arm is pivotally coupled to the chassis at a location closer to the vehicle's unloaded ("CGU" in FIG. 5) or loaded ("CGL" in FIG. 5) centers of gravity than the wheels or the wheels rotational axes. In addition, the torsion bars (i.e. spring elements that apply a torque to the control arms) are anchored at one end to the chassis at brackets 326, which are closer to the centers of gravity than the opposite end of the torsion bars which are fixed to the control arms. As a result of this coupling of the suspensions to the chassis, when a transient upward force (such as an upward impulse force caused by running over a rock) is applied to a wheel, it is not transferred directly to the corner of the chassis where the wheel is located, but is translated to the chassis as an upward force at the control arm pivot point (i.e. at the spherical bearings) and as a torque applied adjacent to the center of gravity. By translating this force away from the corner of the vehicle to a more central location on the chassis (i.e. a location closer to the center of gravity) the degree of pitching is significantly reduced. In short, the vehicle rides smoother over uneven ground.

Control System

In the previous section we discussed the structural features of the skid steer loader having a sprung and damped suspension. In the simplest embodiment of the suspension, hydraulic cylinders 138 are simply shock absorbers—passive shock absorbers such as those regularly employed in automobiles and trucks to damp the oscillation of a suspension with respect to a vehicle chassis. In a preferred embodiment, they can be electronically controlled automotive or truck-type shock absorbers in which an electrical signal transmitted to the shock absorber regulates the stiffness of the shock and/or the degree of damping provided by the shock absorber. In a more preferred embodiment, they can be load leveling or gas filled shock absorbers in which the damping structure within the shock absorber itself pumps the shock absorber up to a proper height of operation, or one in which the operator may charge a gas bladder within the shock absorber to raise or lower the suspension by providing a spring force in addition to (or in place of) that provided by the torsion bars. This arrangement would be sufficient to damp the vehicular oscillations in existing skid steer loaders and thereby increase the speed and the load-carrying capacity of a conventional skid steer loader.

There are several other features to the system, however, embodied in the hydraulic circuitry and the electronic circuitry illustrated herein that collectively comprise the control system of the skid steer loader and that significantly enhance the operation of a skid steer loader with the mechanical suspension described above. In this section such an improved control system will be explained including the operator input devices and the manner in which they operate, the electronic controllers and their programming, and certain features of the hydraulic circuit that the operator input devices and the electronic circuitry control.

Figure 6A:
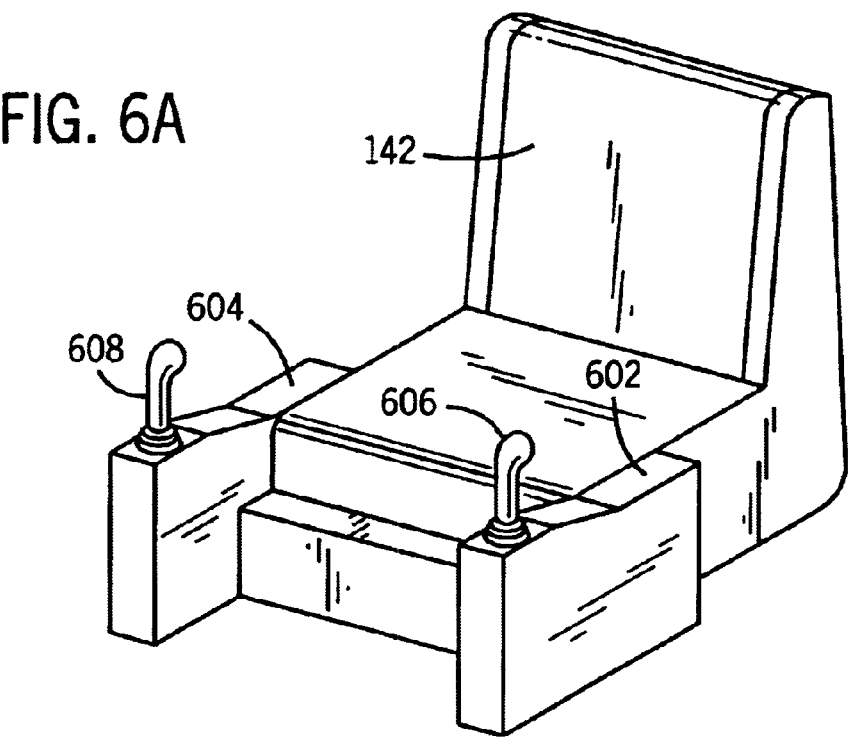
FIG. 6A is a perspective view of the operator's seat and operator input devices of the skid steer vehicle.
Figure 6B:
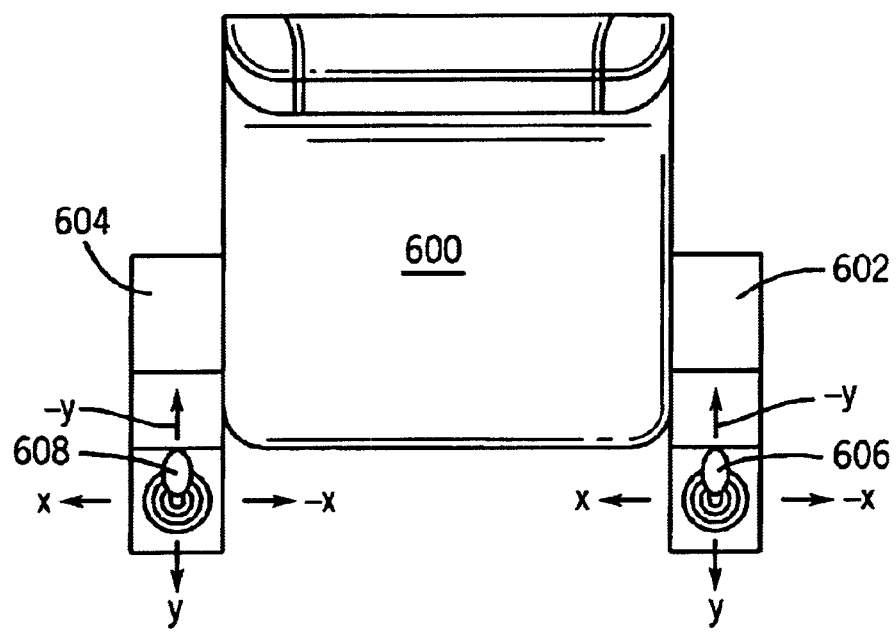
FIG. 6B is a top view of the operator's seat and operator input devices showing the two orthogonal x- and y-axis directions of movement.
Figure 6D:
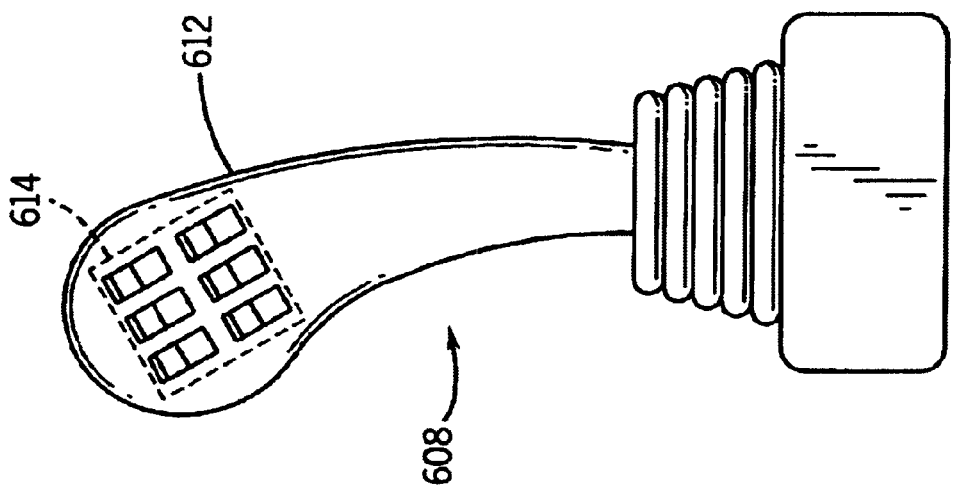
FIGS. 6C and 6D are rear views of the two operator input devices of FIGS. 6A and 6B showing the arrangement of buttons or switches that signal the vehicle's control system.

FIGS. 6A and 6B illustrate the primary operator input devices that are preferred for use with the vehicle described above. As shown in FIG. 6A, the operator's seat 142 located in operator compartment 130 includes a pair of arm rests: A left arm rest 602 and a right arm rest 604. Each of these armrests has an associated joystick 606 and 608. These joysticks preferably have at least two degrees of freedom that permit motion along an X axis and a Y axis and a combination of the two. FIG. 6B is a plan view of the seat of FIG. 6A showing these two directions. Each of joysticks 606 and 608 are preferably of a pistol grip design. In this preferred grip design, grips 610 and 612 of joysticks 606 and 608 are elongate members that extend generally vertically and provide a wider grasping surface with an area sufficient to permit several switches (described below) to be attached for easy manipulation by the operator when he has deflected the joysticks. This placement or switches on the joysticks themselves permits the operator to engage or disengage switches that transmit signals to the electronic controllers when he is in the midst of a moving or lifting operation using the same hand he uses to manipulate the joystick.

Joysticks 606 and 608 are preferably spring-loaded devices that return to a central and upright neutral position when released by the operator. The joysticks preferably generate two separate electrical signals, each electrical signal indicating the deflection of the joystick in the X and the Y directions. Thus, when the joystick is moved fore-and-aft (i.e. in the Y direction or −Y direction) a first electrical signal generated by that joystick not only the distance deflected but the direction it is defected from the neutral position as well. In a similar fashion, when the joysticks are moved laterally with respect to the vehicle from their neutral position either to the left or to the right (i.e. in the −X or X direction) a second electrical signal is generated that indicates not only the distance of the deflection from the neutral position, but the direction it is defected as well. In this manner, both joysticks resolve motion in their two orthogonal directions (X and Y) into two separate electrical signals for processing by the electronic controller to which the joysticks are coupled (described below).

Joysticks 606 and 608 are preferably configured to generate electrical signals by way of internal potentiometers or shaft encoders coupled to the grips of the joysticks. This arrangement is conventional and well known in the art.

Figure 6C:
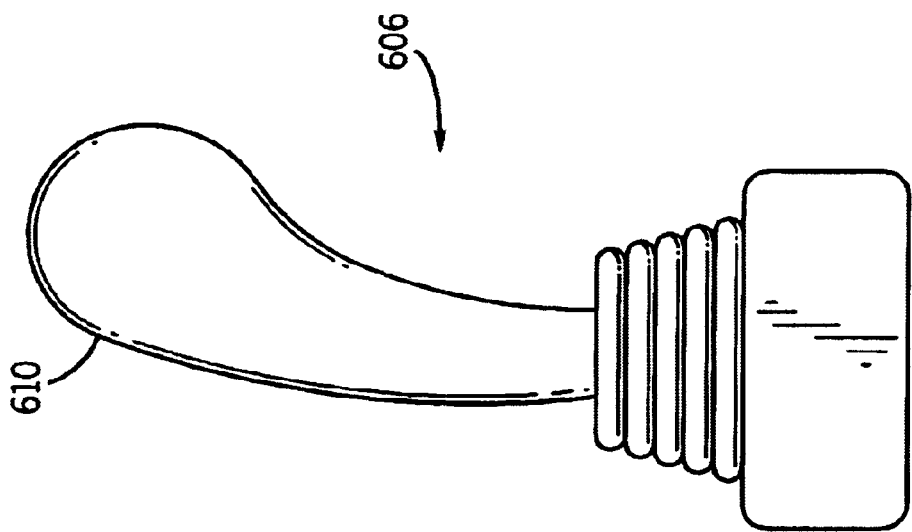

FIG. 6C illustrates details of the construction of grips 610 and 612. In these embodiments, the grips are upright and slightly inwardly turning.

Figure 8:
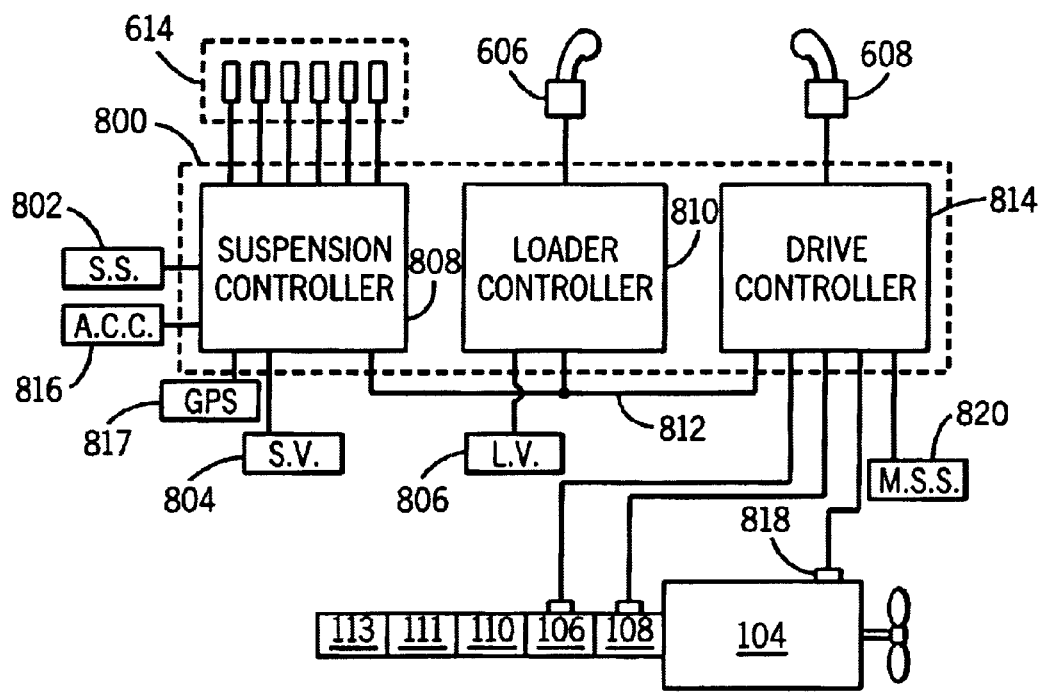
FIG. 8 is a schematic of the electronic control system of the vehicle showing the multiple electronic controllers configured to control the suspension, the loader arm and bucket, and the drive pumps and motors, as well as the sensors and actuators to which the electronic controllers are coupled.

A plurality of buttons or switches 614 are provided on the handle of joystick 608 to permit the operator to select various modes of operation of the suspension system. The switches 614 are electrically connected to the electronic control system, and in particular to the suspension controller of the electronic control system (FIG. 8). In an alternative embodiment (not shown), the switches or buttons 614 can be mounted in a similar location and manner on joystick 606. By fixing switches or buttons 614 to joysticks that control the drive motors, or the loader cylinders and the bucket cylinders, the operator can signal the control system connected to the switches with the same hand he is using to move the vehicle over the ground or to raise and lower the loader arms or to tilt the bucket cylinders without having to release these controls. The joysticks are self-centering, and move to a normally "off" or central position in which hydraulic fluid flow to and from the hydraulic motors that drive the vehicle and the hydraulic cylinders that position the bucket and loader arms is stopped. If the user was required to release the joysticks to manipulate buttons or switches 614 (as he would be if they were not located on the joysticks), the vehicle would stop moving and the loader arms and bucket would stop moving until he again grasped and manipulated the joysticks.

Each of the joysticks 606 and 608 permit grips 610 and 612 to move to virtually an infinite number of positions in the two-dimensional X/Y plane. This permits the operator to select joystick 606 controls the operation of the lift arms and the bucket tilt position. When joystick 606 is moved from the neutral position (shown in FIG. 6B) forward in the +Y direction, the electronic control system causes loader arms 120 (FIG. 1) to lower. This lowering is caused by the retraction of the piston rods of lift cylinders 112 into the hollow cylinder itself. In a similar fashion, moving joystick 606 in the −Y direction by pulling the joystick handle straight back towards the operator causes the upward movement of the lift arms. When joystick 606 is moved from the neutral position in the +X direction (i.e. toward the right as shown in FIG. 6B) bucket cylinder 114 retracts, thereby pivoting bucket 116 about pivot joint 118 in a direction which serves to hold material within bucket 116. Similarly, when the operator moves joystick 606 in the −X direction (to the left as shown in FIG. 6B) bucket cylinder 114 extends causing bucket 116 to pivot about joint 118 in a direction that empties the bucket.

The rate at which the bucket cylinder and the lift cylinders move is a function of how far the joystick is deflected in either the +X and −X direction or the +Y and −Y directions respectively. The farther the joystick is deflected, the faster the corresponding cylinders extend and retract.

Joystick 606 can move simultaneously in both the X and Y directions. Since two signals are generated by joystick 606 indicative of movement in both the X and the Y directions, joystick 606 is thereby configured to simultaneously generate two electrical signals, one indicative of the rate of bucket tilt and the direction of bucket tilt and the other electrical signal indicative of the rate at which the loader arms will be lifted or lowered and their direction of movement, (i.e. whether loader arms 120 are lifted or lowered).

Joystick 608 is configured to control the pumps 106 and 108, which are coupled to engine 104 (FIG. 1). These pumps are hydraulically connected to the four drive motors, and hence control the direction and speed of travel of the loader. Joystick 608 when moved forward from the neutral position (show in FIG. 6B) in the +Y direction causes the wheel loader to move straight ahead. When joystick 608 is pulled backwards toward the operator in the −Y direction, it causes the loader to move straight backwards. When joystick 608 is moved in the −X direction (leftward in FIG. 6B) from the neutral position, it causes the loader to pivot about a vertical axis extending upward through the center of the vehicle without moving forwards or backwards. Similarly, when joystick 608 is moved in the +X direction (rightward in FIG. 6B) it causes the loader to rotate in a rightward direction about a vertical axis extending generally upward through the center of the vehicle. As in the case of joystick 606, the speed of movement is a function of the amount of joystick deflection. The farther joystick 608 is deflected in the +Y direction, the faster the vehicle moves forward. The farther the joystick 608 is moved in the −Y direction, the faster the vehicle moves backwards. The farther the joystick is moved in the −X direction, the faster the vehicle turns to the left. The farther the joystick is moved in the +X direction, the faster the vehicle turns to the right.

As in the case of joystick 606, joystick 608 is free to move to virtually an infinite number of positions in the X-Y plane. In these positions joystick 608 will generate both a fore-and-aft signal and a side-to-side signal indicative of combined forward or backward movement and rotational movement. Thus, by moving joystick 608 into the upper right quadrant of the X-Y plane, the loader will not only move forward but will turn gradually to the right. Moving the joystick into the upper left quadrant will cause the vehicle to move both forward and to the left. Movement into the lower left quadrant causes the vehicle to move backward and to the left. Movement of the joystick into the lower right quadrant causes the vehicle to move backward and to the right.

This movement is caused by the electronic control system responding to the two discrete electrical signals provided by joystick 608, one indicative of motion in the Y direction and one indicative of motion in the X direction. The electronic control system is coupled to pumps 106 and 108, which are coupled to the left hand and right hand hydraulic motors of the loader, respectively. By varying the output—the specific displacement—of these pumps, the electronic control system causes the wheels on the left side of the loader to rotate at a different speed then the wheels on the right hand side of the loader. It is this difference in right and left side wheel velocity that causes the vehicle to turn, and in the limiting case, to rotate in place.

Figure 7:
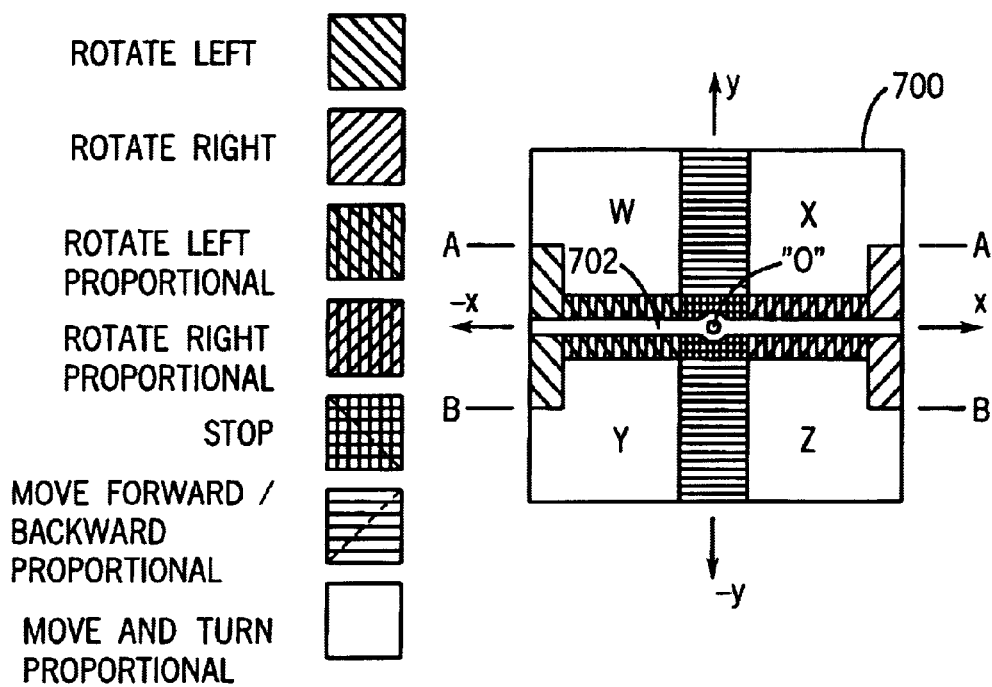
FIG. 7 illustrates the two-dimensional X-Y plane of movement of joystick 608, shown in FIGS. 6A, 6B and 6D as one of the operator input devices.

FIG. 7 is a map of all the positions in the X-Y plane to which the operator can move joystick 608. The outer box 700 shows the entire range of combined X and Y positions to which the joystick can be moved.

When the joystick is in its neutral or origin position, shown in FIG. 7 as "0", the loader doesn't move. Thus, whenever the operator releases the joystick and it returns automatically to its origin or neutral position by its internal springs, the loader is stopped. No hydraulic fluid is provided by pumps 106 and 108 to the drive motors. The electronic control system may stop the wheels immediately on return to neutral or origin position "0", or it may gradually reduce the speed of the vehicle to zero while keeping the vehicle deceleration within acceptable limits. In either case, return of joystick 608 to the neutral origin position "0" stops the vehicle.

Referring now to FIG. 7, we can see a two-dimensional map of the positions in the X and Y directions to which the operator can move joystick 608. The joystick is configured to generate two independent signals as it is moved into any of these regions, one signal indicative of the amount of movement of the joystick in the +X and −X directions and one signal indicative of the degree of movement of the joystick in the +Y and −Y directions as well as the direction of movement away from the origin "0". In each region, the electronic control system (preferably drive controller 814) performs particular actions based upon the signals it receives from the joystick. When the joystick is in a particular region of the X-Y plane (as indicated to the controller by the magnitude of the two independent joystick signals it receives) the drive controller performs certain operations associated with that region. These regions are represented graphically in FIG. 7 in terms of the position of joystick 608. The drive controller maintains a "map" of possible joystick positions and performs the functions associated with that region by comparing the two joystick signals with its internal map to determine the current joystick region.

In the preferred embodiment, the drive controller receives the signals from joystick 608, determines which region the joystick is in, determines the magnitude of the two signals, calculates the desired movement of the vehicle corresponding to that region and the location of the joystick in that region, calculates the specific displacement of pumps 106 and 108 to provide that desired or commanded movement, and signals the pumps to provide that specific displacement. Changing the displacement of the pumps drives the wheels in accordance with that region (as described below).

When the joystick is moved to the left to any of the positions indicated in the "rotate left" region, a signal is transmitted from the joystick to the drive controller or interpreted by the drive controller to be a request for the vehicle to rotate about a generally vertical axis that passes through the center of the vehicle. In short, the drive controller causes the left side wheels to rotate in reverse at a first velocity and the right side wheels to rotate forward at the same velocity. This causes the vehicle to skid steer in place without moving forward or reverse. This assumes of course that the texture of the ground permits the vehicle to skid steer in this manner. Note that the rotate left region includes some movement in the Y direction. This movement will not cause the vehicle to move forward or back. In short, movement of the joystick anywhere in the rotate left region of movement causes the vehicle to rotate left in place. A rotate left region is made so any accidental jostling of the joystick in the Y direction will not cause the loader to suddenly lurch forward or backwards in the middle of a skid steer rotation to the left. Thus, if the joystick moves as far in the Y direction as point A or point B the vehicle will still rotate to the left and provide generally equal and opposite rotation of velocities to the left and right side tires.

A similar region called the "rotate right" region is provided when the joystick is moved to its rightmost position. In this case, when the joystick is placed in the rotate right region by the operator, the drive controller causes the skid steer loader to rotate rightwardly about a vertical axis extending generally to the center of the vehicle by causing the wheels on the right side of the vehicle to rotate in reverse at a given velocity and the wheels on the left hand side of the vehicles to rotate in a forward direction at the same velocity. Again, this accommodates the accidental jostling of the joystick in the Y direction when the operator intends to merely rotate the vehicle to the right about its vertical axis (i.e. to rotate rightwardly in place).

Another region defined in the range of possible motion of joystick 608 is the "rotate left proportional" region. When the joystick is moved from the origin, "O", leftwardly, the drive controller applies equal and opposite velocities to the left wheels and the right wheels proportional to the distance the joystick has been moved in the −X direction. Note that as in the case of the rotate left and rotate right regions, some deflection in the Y direction is permissible without causing the vehicle to move forward or backward. In this region, the rotation of velocities are equal and opposite with the wheels on the left side rotating in reverse at the same speed that the wheels on the right side are rotating forward.

The "rotate right proportional" region functions similarly to the rotate left proportional region. When the joystick is moved rightwardly from the origin the drive controller is configured to rotate the left side and right side wheels at the same velocity but in opposite directions. A rotation of velocity of the wheels is equal and opposite and is proportional to the distance the joystick is deflected from the origin. In the rotate right proportional region, the left side wheels rotate forward and the right side wheels rotate in reverse. This causes the vehicle to generally rotate about a vertical axis located generally at the center of the vehicle.

There is a central region called the "stop" region in which the electronic control system is configured to hold all the wheels stationary and not apply hydraulic fluid to the hydraulic motors driving the wheels. This permits the operator to rest his hand on the joystick and move it slightly without causing a sudden lurch of the vehicle by movement in either the forward or reverse directions, or by rotation about a vertical axis, or by a combination of these two movements. In addition, there is a narrow dead band shown as region 702 that extends laterally in the X and −X directions from the spring return origin "O". Whenever the joystick is moved side-to-side (i.e. in the X or −x directions) in this narrow region, the drive controller is configured to hold the vehicle wheels stationary by setting the output of pumps 106 and 108 to zero.

Many times, the operator will wish to move the skid steer loader straight ahead or straight backwards without turning either to the right or the left. This can only be achieved by driving both the left and right wheels in the same direction at the same velocity. There are two regions of the array of position shown in FIG. 7 that provide this capability. They are identified as the "move forward/backward proportional" region in the legend of FIG. 7. When the joystick is moved from the origin straight forward in the Y direction, the electronic controller is configured to drive the wheels on both sides of the vehicle forward at a velocity proportional to the deflection in the Y direction. The velocities of the wheels on the left side and the wheels on the right side of the vehicle will remain substantially the same as long as the joystick stays within this region. Note that the region has a finite predetermined width in the X and −X directions. The reason this width is provided is to accommodate the almost inevitable side-to-side jostling of the joystick that will occur as the operator moves the vehicle forward through the field. Without providing this finite predetermined width, when the operator hit a bump and nudged the joystick away from the Y axis the vehicle would turn slightly to the right or the left away from the straight ahead direction that the operator wishes to move it.

There is a similar area provided for deflections of the joystick from the origin in the −Y direction. This region has the same functionality as the straight ahead region in that it accommodates slight side to side jostling of the joystick in the X or −X direction without causing the vehicle to veer side to side. Since this portion of the move forward/backward proportional region is disposed below the origin (in FIG. 7) it ensures that the vehicle will move straight backwards without veering side to side.

The speed of rotation of the wheels whether the vehicle is going forward or backwards in the "move forward/backward proportional" region is proportional to the degree of deflection of the joystick away from the origin. The farther the joystick is moved from the origin in the Y direction, the faster the vehicle moves forward. The farther the joystick is moved from the origin in the −Y direction, the faster the vehicle moves backwards. Again, as long as the joystick is kept within the move forward/backward proportional region, the electronic control system will apply the same amount of hydraulic fluid from pumps 106 and 108 to the left and right side wheels at the same rate. Thus, the vehicle will travel straight forward or straight in reverse.

The final region of the two dimensional array of positions of joystick 608 is the "move and turn proportional" region. This region is actually in the form of four separate regions in the upper left, upper right, lower left, and lower right areas or quadrants of the two dimensional array of positions identified as "W", "X", "Y" and "Z". Whenever the joystick is moved into these areas, the drive controller is configured to drive the left side wheels at a different velocity then the right side wheels and also to drive them at these different velocities in the same direction. Thus, when the joystick is moved into the move and turn proportional region identified as "W", both the left side wheels and the right side wheels are driven forward. In this region the right side wheels are driven at a velocity greater than the left side wheels thereby causing the vehicle to move forward and also turn to the left. In region "X", both the left side wheels and the right side wheels are driven forward. The left side wheels, however, are driven forward at a velocity greater than that of the right side wheels. This causes the vehicle to move forward and gradually turn to the right. In region "Y", both the left side wheels and the right side wheels are driven in reverse causing the vehicle to move backwards. The right side wheels are driven slightly faster in the reverse direction then the left side wheels, however, causing the vehicle to travel in reverse and turn the front of the vehicle towards the right (i.e. rotate clockwise). Similarly, in region "Z", both the left side and right side wheels are driven in reverse with the left side wheels rotating at a higher velocity then the right side wheels. This causes the vehicle to move backwards and at the same time to turn the front of the vehicle towards the left (i.e. to rotate counter clockwise). In each region W, X, Y, and Z, the velocities of the wheels change proportional to the degree of deflection in the X and Y directions. The farther the joystick is moved in the −X direction, the greater the velocity of the right side wheels with respect to the left side wheels. The farther the joystick is moved in the X direction, the greater the velocity of the left side wheels with respect to the right side wheels. In a similar fashion, while in the move and turn proportional region, the farther the joystick is moved in either the Y or the −Y direction away from the origin, the faster both the wheels on the left side and on the right side rotate.

For all the joystick positions shown in FIG. 7, regardless of the particular region the joystick is in, it is the electronic control system, and in particular the drive controller that is configured to receive the two electrical signals indicative of deflection in the +Y/−Y direction and deflection in the +X/−X direction and to convert them into the appropriate flow rates of fluid through the hydraulic motors on each of the 4 wheels. This electronic control system is shown in schematic form in FIG. 8.

Referring now to FIG. 8, the electronic control system 800 is shown as it is connected to the other major components of the system including joystick 606 and 608, buttons 614 on joystick 608, suspension sensors 802 which indicate the pivotal position of each of the four suspensions with respect to the chassis, the suspension valves 804 which control fluid flow to and from hydraulic cylinders 138, loader valves 806 which control fluid flow to and from lift cylinders 112 and bucket cylinders 114 and hydraulic pumps 106 and 108 which provide fluid to each of the 4 hydraulic motors that drive the 4 wheels of the vehicle. Electronic control system 800 is preferably configured as a plurality of individual electronic controllers 808, 810, and 814 that communicate with one another to share data that indicates the position of the various sensors, actuators, and operator input devices to which they are coupled. Controller 808 in the preferred embodiment is called the suspension controller since it is responsible for controlling the operation of hydraulic cylinders 138 in response to suspension positions indicated by suspension sensors 802 and operator commands entered through buttons 614. A second electronic controller, loader controller 810 is called a "loader controller" since it is electronically connected to joystick 606, the operator input device used by the operator to command the desired motion of the loader lift arms and the bucket, as well as controlling the loader valves 806 that regulate the flow of fluid to and from those cylinders.

The final electronic controller in electronic control system 800 is the drive controller 814. It is called a "drive controller" since it receives operator commands from joystick 608, the input device used by the operator to command the direction and manner of movement of the skid steer loader. It controls the speed of the wheels in response to the operator's joystick commands. Drive controller 814 controls the specific displacement of hydraulic pumps 106 and 108 to which it is coupled. The "specific displacement" of a pump is the volume of hydraulic fluid the pump provides for each cycle or revolution of that pump. In the preferred embodiment, pumps 106 and 108 are piston pumps and their displacement is changed by varying the swash plate position of those pumps.

Pump 106 is hydraulically coupled to motors 310A and 310B (FIG. 9) which are connected to the front and rear wheels 102A and 102B on the left side of the vehicle. Pump 108 is hydraulically coupled to motors 310C and 310D (FIG. 9) which are connected to the front and rear drive wheels on the right side of the vehicle.

At a constant engine speed (the typically mode of operation) the speed of the motors is varied directly with the specific displacement of the pumps. Thus the specific displacement of the pumps is generally proportional to the rotational speed of the motors and hence the rotational speed of the wheels and hence the speed of the vehicle over the ground.

Drive controller 814 is also electrically connected to motor speed sensors 820. These sensors are preferably shaft encoders mounted on motors 310A, 310B, 310C and 310D to provide a signal indicative of the wheel (motor) velocity. Since the wheels are fixed to their respective motors through planetary gear reduction wheel hubs (FIG. 3), the relationship between the speed of the motors and the speed of the wheels is fixed and proportional.

Each of controllers 808, 810, and 814 are coupled to one another via a serial communications bus 812, which transmits data from one controller to the other as needed in order to permit each controller to perform the functions described herein.

The preferred circuit for suspension controller 808, loader controller 810, and drive controller 814 is the Siemens C167 electronic control unit. This device is particularly preferred since it includes RAM and ROM memory on board, has pulse width modulation (PWM) driver circuitry on board, and has signal conditioning circuits configured to debounce and otherwise condition signals received from electronic sensors and switches such as buttons 614. A further advantage in using the Siemens C167 electronic control unit for each of the controllers shown herein, is the fact that it also includes a built-in serial communications bus circuitry that permits it to communicate with similar devices over serial communications bus 812 shown in FIG. 8. This circuitry is configured to communication using the SAE J-1939 CAN bus communications protocol. In the preferred embodiment, serial communications bus 812 is a CAN bus.

Suspension sensors 802 are preferably shaft encoders or potentiometers coupled both to chassis 100 and to each of the swing arms (four suspension sensors in all) to sense the pivotal position of each of the swing arms with respect to chassis 100 and to provide a signal indicative of this position to controller 808. In this manner, suspension controller 808 is aware of the height of the vehicle with respect to the ground and the position of the suspensions with respect to the chassis.

In an alternative embodiment, suspension sensors 802 may be limit switches, such as an upper, a lower, or upper and lower limit switches fixed to the chassis or to the control arms to indicate whether the suspension is above or below a particular pivotal position limit, or whether the suspension is within an upper and a lower position limit. The limit switches can be fixed to the chassis or to the suspension components. They may be contact devices that require actual contact to operate, or proximity devices such as Hall effect switches or light sensors.

Suspension controller 808 is electrically connected to an accelerometer 816, which is fixed to the vehicle to provide a signal indicative of the acceleration of the vehicle in a fore-and-aft direction as well as laterally (side-to-side). Suspension controller 808 is electrically coupled to a satellite navigation receiver 817 that provides vehicle position data to the suspension controller. The satellite navigation receiver is preferably a GPS receiver. Based upon this position data, suspension controller 808 is configured to calculate lateral and longitudinal acceleration as well as vehicle velocity.

Suspension controller 808 is also coupled to and drives suspension valves 804. These valves (shown in more detail together with the rest of the hydraulic suspension circuit in FIG. 10), control the rate at which hydraulic cylinders 138 extend and retract. In addition, they control the degree of damping provided by hydraulic cylinders 138 by varying the effective orifice size through which hydraulic fluid is released from and introduced to the hydraulic cylinders.

Loader controller 810 is electrically connected to operator input device 606, the joystick that controls the operation of the lift cylinders and the bucket cylinders. This is shown in more detail in the hydraulic circuit of FIG. 10 as described above in conjunction with FIGS. 6A and 6B.

Loader controller 810 is configured to receive the electrical signals from joystick 606, one signal indicative of lateral movement (X/-X) of joystick 606 and the other signal indicative of fore-and-aft movement (Y/-Y) of joystick 606, and to convert those two electrical signals into signals that it applies to the loader valves 806. These applied signals cause lift cylinders 112 and bucket cylinders 114 to extend or retract thereby raising and lowering loader arms 120, and dumping or inwardly tilting the bucket 116.

Drive controller 814 is electrically connected to joystick 608 to receive two electrical signals, one indicative of lateral motion of the joystick and one indicative of fore-and-aft motion of the joystick. As described above in conjunction with FIGS. 6A–6D and 7, drive controller 814 is programmed to receive the signals and, depending upon the magnitude of the two signals (i.e. the electrical signal indicating deflection in the X or side-to-side direction and the electrical signal indicating joystick deflection in the Y or fore-and-aft direction), calculates the appropriate specific displacements (i.e. swash plate positions) of pumps 106 and 108 and transmits an electrical signal to those swash plate positions to pumps 106 and 108 to cause the wheels on the left side and on the right side of the vehicle to rotate at the commanded speed. These commanded specific displacements indicate the desired velocities of the wheels and are saved in digital memory locations in drive controller 814. By varying the specific displacement of pumps 106 and 108, the volumetric flow rate of fluid to the four drive motors (one hydraulic motor per wheel) the rate at which the wheels rotate is varied.

To determine the appropriate swash plate position and thus the specific displacement of pumps 106 and 108, drive controller 814 is coupled to speed sensor 818 on engine 104. Speed sensor 818 provides a signal to drive controller 814 that is indicative of the rotational speed of engine 104. Pumps 106 and 108 rotate at a speed proportional to that of engine 104. If they are directly coupled to the crankshaft of engine 104 as shown in FIG. 8, they rotate at the identical speed as that of engine 104. Thus, drive controller 814 calculates the volumetric flow rate from pumps 106 and 108 and determines the desired swash plate position of each of pumps 106 and 108 by combining the speed signal from speed sensor 818 with the desired vehicle speed indicated by joystick 608. The drive controller combines these values and determines the appropriate specific displacements and swash plate positions of pumps 106 and 108 accordingly.

Figure 9:
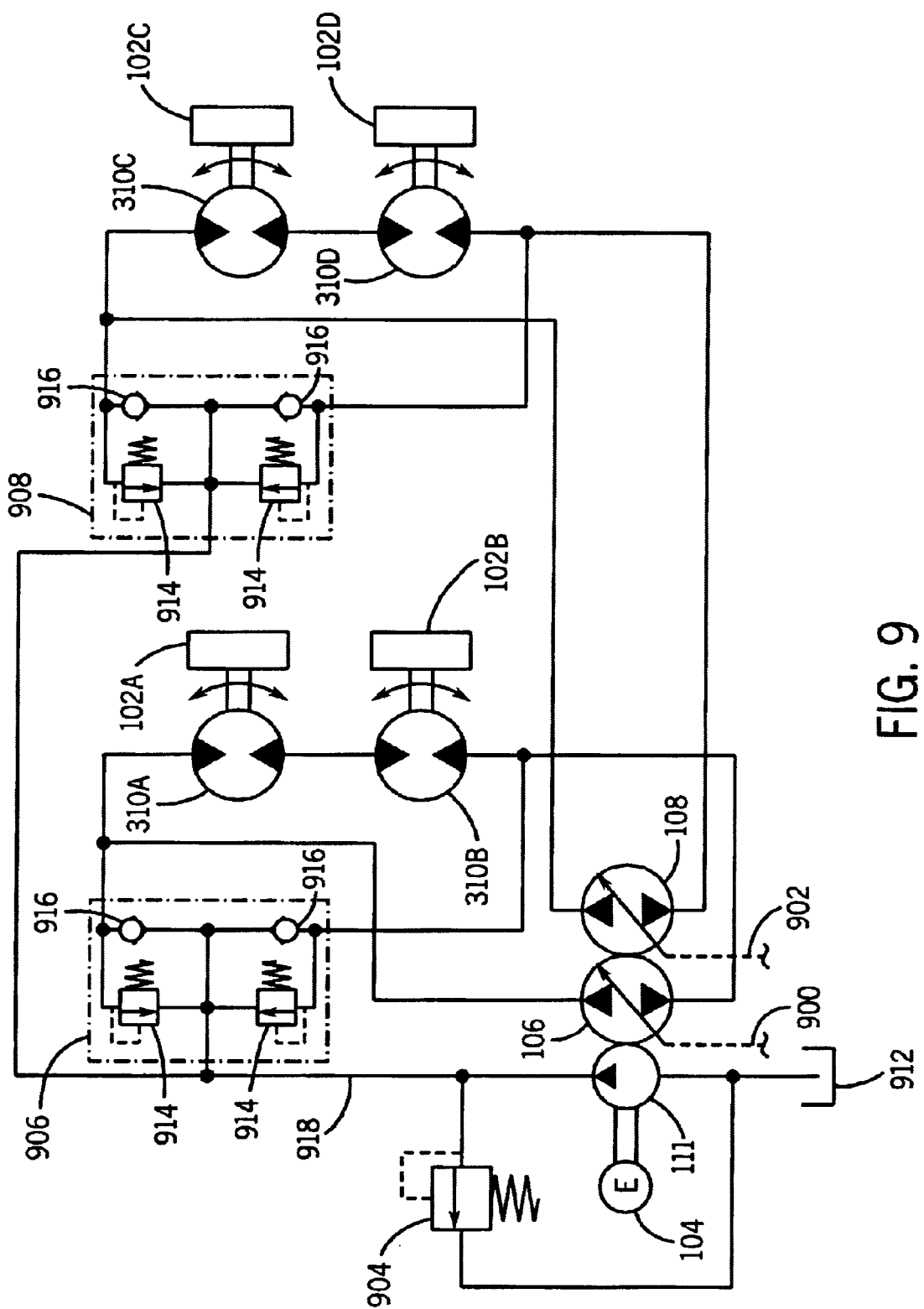
FIG. 9 is a hydraulic schematic diagram of the hydraulic drive circuit that is driven by the vehicle engine and controlled by the drive controller of FIG. 8 to drive the vehicle over the ground.

FIG. 9 illustrates a simplified hydrostatic drive circuit, the circuit that connects pumps 106 and 108 to the four hydraulic motors that are coupled to each of the wheels 102. In FIG. 1, the wheels were identified simply as wheels 102. In this FIGURE, they are identified as left front wheel 102A, left rear wheel 102B, right front wheel 102C and right rear wheel 102D. The corresponding hydrostatic motors that drive each of these wheels are indicated as left front hydrostatic motor 310A, left rear hydrostatic motor 310B, right front hydrostatic motor 310C and right rear hydrostatic motor 310D. Motors 310A and 310B are connected in series with pump 106 to provide a continuous fluid flow circuit from pump 106 through motor 310A then through motor 310B then back to pump 106. In addition, pump 106 can drive fluid in the opposite direction through the hydraulic flow path from pump 106 through motor 310B, then through motor 310A and then back to pump 106. Pump 108 and hydrostatic motors 310C and 310D are similarly arranged as a continuous bi-directional fluid flow circuit and are similarly configured for flow in both directions. As indicated by the symbols used for pumps 106 and 108, the pumps have a variable displacement that is controlled by signal lines 900 and 902, respectively, that extend from the swash plate controls on the pumps to drive controller 814. In this manner, drive controller 814 is able to vary the specific displacement of these pumps to provide a continuously variable flow rate in both directions through the pumps and motors. Each of pumps 106 and 108 are connected to and driven by engine 104.

It should be understood from FIG. 9 that there are essentially two independent hydraulic drive circuits. One circuit connects one pump and two hydraulic motors on one side of the vehicle. Another circuit connects a second pump and two hydraulic motors on the other side of the vehicle. Thus, drive controller 814 can, by varying the displacement of each of the two pumps controlling these separate circuits, separately and independently vary the speed and rotational direction of the motors on each side of the vehicle. It is this ability to separately control the motors (and hence the wheels) on each side of the vehicle that provides the skid steering ability of the vehicle.

Each of the two drive circuits includes an additional circuit element connected in parallel with the pump (and also with the motors). These elements are overpressure relief valve and hydraulic fluid make-up circuits 906 and 908. Relief circuit 906 is coupled to the drive circuit for the wheels on the left hand side of the vehicle, including pump 106 and motors 310A and 310B. Relief circuit 908 is coupled to the drive circuit for the wheels on the right hand side of the vehicle, including pump 108 and motors 310C and 310D.

When pumps 106 and 108 are moved away from their neutral (zero output) positions, they begin to provide pressurized hydraulic fluid to their respective motors. This pressure can be applied in either direction, depending upon the commanded position of the pumps' swash plates. This pressure acts against the check valve 916 in the relief circuit causing to remain closed. It also acts against pressure relief valve 914. When the pressure acting on the relief valve rises above a predetermined pressure (that is slightly above the operating pressure of the circuit), relief valve 914 opens causing fluid to enter hydraulic line 918. This line, in turn, is coupled to charge pump pressure relief valve 904, which is set at a predetermined pressure that is lower than the pressure setting of relief valve 914. This causes relief valve 904 to open and direct the hydraulic fluid back to hydraulic tank or reservoir 912. In this manner, pressures above the design pressure of the circuit are released and excess hydraulic fluid is returned back to tank 912. Note that each of circuits 906 and 908 are symmetrical with respect to their associated pumps and therefore provide pressure relief capabilities for hydraulic fluid flows acting in either direction though their respective drive circuits.

Charge pump 111 is also coupled to engine 104 to provide a supply of make-up hydraulic fluid. Typically, the components in each of the drive circuits exhibit some leakage, and therefore additional hydraulic fluid must be provided to replace the lost fluid. This is the function performed by charge pump 111. Charge pump 111 typically provides hydraulic fluid at a lower pressure than the high output pressure provided by pumps 106 or 108 as regulated by relief valve 904. Valve 904 is typically set at a pressure of about 300 psi. When the output of charge pump 111 rises to the pressure setting of relief valve 904, valve 904 opens and conducts the fluid from pump 111 back to tank 912.

The fluid pumped by charge pump 111 enters hydraulic line 918 and is conducted into circuits 906 and 908. Since these circuits are connected in parallel with pumps 106 and 108, one side of these circuits is at a relatively low pressure and one side is at a relatively high pressure (assuming pumps 106 and 108 are not in neutral and are therefore providing hydraulic fluid under pressure to their respective motors) As described above, one of the check valves 916 in circuits 906 and 908 is connected to the high pressure side of pumps 106 and 108, respectively, and therefore is held closed. The other of the check valves 916 in circuits 906 and 908 is connected to the suction or low pressure side of the pumps and is therefore at a lower pressure, typically below the pressure set by charge pump relief valve 904. As a result, hydraulic fluid is forced through check valve 916 connected to the suction side of its respective pump and fills the motor drive circuit with replacement fluid for any fluid that has leaked out or otherwise been released. In this manner, fluid leaking from either drive circuit is replenished automatically.

Figure 10:
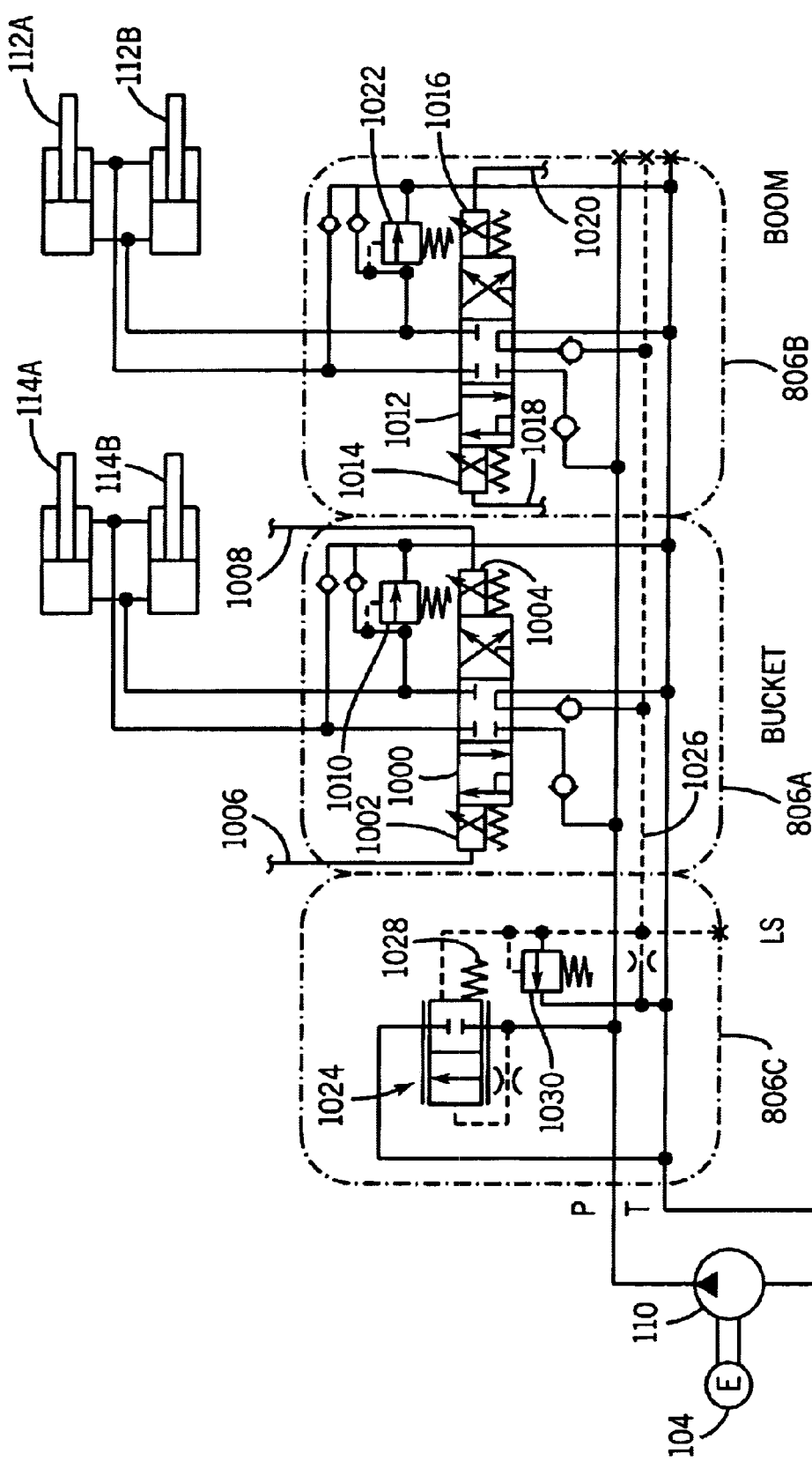
FIG. 10 is a hydraulic schematic of the hydraulic loader circuit that is driven by the vehicle engine and controlled by the loader controller of FIG. 8 to raise and lower the loader arms and tilt the bucket or implement of the vehicle.

FIG. 10 is a simplified schematic of the loader hydraulic circuit, the circuit that lifts and lowers loader arms 120 and tilts bucket 116 (FIG. 1). As described in conjunction with FIG. 1, the loader arms are lifted by two lift cylinders 112, one disposed on each side of the vehicle. Similarly, bucket 116 is pivoted about its pivot 118 by two bucket cylinders 114, one located on either side of the vehicle. In conjunction with FIG. 8, we explained how loader controller 810 controls the motion of these cylinders by loader valves 806 in response to operator commands provided by joystick 606. FIG. 10 illustrates loader valves 806 and their hydraulic connections to motor 110, to lift cylinders 112, and to bucket cylinders 114 that are used to effect these commands. The loader valves 806 of FIG. 8 are shown here as loader valve circuits 806A and 806B.

Referring now to FIG. 10, the loader hydraulic circuit includes engine 104, loader control pump 110, bucket control valve circuit 806A, loader arm control valve circuit 806B, unloading valve circuit 806C, left and right bucket cylinders 114A and 114B (shown as item 114 in FIG. 1), and left and right loader arm cylinders 112A and 112B (shown as item 112 in FIG. 1).

Engine 104 is coupled to and drives pump 110. Pump 110 is supplied with hydraulic fluid from tank or reservoir 912 to which it is coupled. Pump 110, in turn, is coupled to and provides pressurized hydraulic fluid to bucket valve circuit 806A, loader arm valve circuit 806B and unloading valve circuit 806C. Pump 110 is preferably a fixed displacement pump.

Bucket valve circuit 806A regulates the flow of hydraulic fluid under pressure from pumps 110 to left and right bucket cylinders 114A and 114B to which it is coupled. Circuit 806A is coupled to and between the bucket cylinders and the pump and tank.

Loader arm valve circuit 806B regulates the flow of hydraulic fluid under pressure from pump 110 to left and right loader arm cylinders 112A and 112B to which it is coupled. Circuit 806B is coupled to and between the loader arm cylinders, the pump and the tank.

Bucket cylinders 114A and 114B are double-acting cylinders coupled together in parallel to form a common extend port hydraulic line and a common retract port hydraulic line. Loader arm cylinders 112A and 112B are similarly arranged.

Bucket valve circuit 806A includes a hydraulic control valve 1000 that is coupled to and between the pump and tank and the bucket cylinders to regulate the flow of hydraulic fluid into and out of the bucket cylinders. The valve is a bi-directional control valve using two solenoids 1002 and 1004 to actuate the valve. Solenoids 1002 and 1004 are used for retracting (cupping) and extending (dumping) the bucket, respectively. The valves are preferably operated in a proportional control mode using a pulse-width modulated signal that is generated by loader controller 810 and applied to signal lines 1006 and 1008 to solenoids 1002 and 1004, respectively.

Circuit 806A also includes an overpressure relief valve 1010 that is coupled to and between the common extend port hydraulic line and tank 912. When pressure in the common extend port hydraulic line exceeds a preset value, the valve opens and dumps fluid to tank 912.

Loader arm valve circuit 806B includes a hydraulic control valve 1012 that is coupled to and between the pump and tank and the loader arm cylinders to regulate the flow of hydraulic fluid into and out of the loader arm cylinders. The valve is a bi-directional control valve using two solenoids 1014 and 1016 to actuate the valve. Solenoids 1014 and 1016 are used for retracting (lowering) and extending (raising) the loader arms, respectively. The valves are preferably operated in a proportional control mode using a pulse width modulated signal that is generated by loader controller 810 and applied to signal lines 1018 and 1020 to solenoids 1014 and 1016, respectively.

Circuit 806B also includes an overpressure relief valve 1022 that is coupled to and between the common extend port hydraulic line and tank 912. When pressure in the common extend port hydraulic line exceeds a preset value, the valve opens and dumps fluid to tank 912.

Unloading valve circuit 806C includes an unloading valve 1024 that dumps fluid flow from pump 110 whenever the output of pump 110 generates a higher pressure than the pressure applied to valve 1024 on signal line 1026 (plus an offset pressure determined by spring 1028). Signal line 1026 is connected to tank when both bucket valve 1000 and loader arm valve 1012 are closed thereby unloading the circuit when no hydraulic fluid is needed. Pump 1000 is loaded until it generates a pressure equal to tank pressure (about 0 psi) plus the pressure equivalent provided by spring 1028. This is typically about 60 psi.

Whenever either the bucket valve 1000 or the loader arm valve 1012 (or both) is opened, signal line 1026 is connected through the opened valve (or valves) to the cylinders. The unloading valve the closes until the pressure is about 60 psi above the pressure in the cylinder (i.e. in signal line 1026).

In this manner, pump 110 is unloaded to provide a net positive pressure to the cylinders of about 60 psi, regardless of the actual pressure in the cylinder.

Should the pressure in signal line 1026 exceed proper design limits, a pressure relief valve 1030 that is coupled to and between tank 912 and signal line 1026 will open causing the fluid in signal line 1026 to dump to tank 912.

In the loader control circuit of FIG. 10, valves 1000 and 1012 are bi-directional and are shown as a single valve body. They may be in the form of a single valve, as shown here, or may be configured as two or more valves. They may be driven by a pulse width modulated signal or a current driver circuit. The various pressure relief and overpressure control elements can be eliminated or placed elsewhere if the system components are sufficiently strong. The unloading circuit is preferred when the system is used with a fixed displacement pump. If a variable displacement pump is used, or if valves 1000 or 1012 are configured as open center valves, it can be eliminated or reconfigured.

Figure 11:
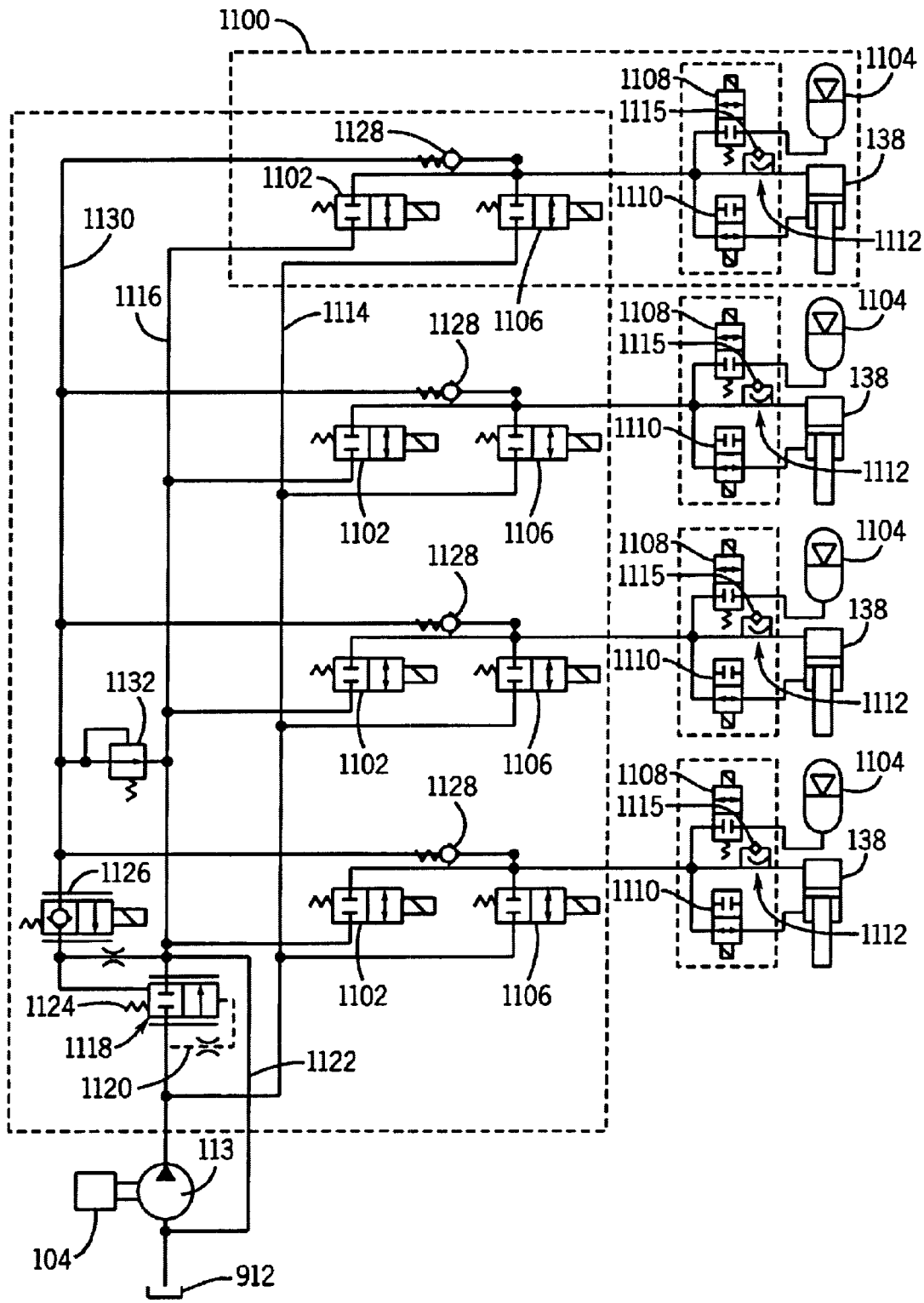
FIG. 11 is a hydraulic schematic of the hydraulic suspension circuit that is driven by the vehicle engine and controlled by the suspension controller of FIG. 8 to control the height, the springing and the damping of the four sprung vehicle suspensions.

FIG. 11 illustrates the suspension hydraulic circuit, the hydraulic valves, accumulators and actuators that collectively control the flow of hydraulic fluid to and from cylinders 138. Valves 1102, 1106, 1108, 1110, and 1126 are shown in FIG. 8 as suspension valves 804. As explained in conjunction with FIG. 1, cylinders 138 may be traditional passive hydraulic shock absorbers. They may also, however, be electronically controlled hydraulic actuators such as the double-acting dual-ported hydraulic cylinders 138 illustrated in FIG. 11. By providing intelligent control of the flow of fluid into and out of cylinders 138, and the connection between the cylinders and their associated springs (i.e. accumulators 1104) the ride of the skid steer vehicle can be optimized for a variety of operating conditions.

As shown in FIG. 11, each of the four suspensions on the skid steer vehicle includes several components indicated by block 1100. There are four of these sets of components, one for each of the suspensions on the vehicle shown one above the other in FIG. 11. Each suspension includes a retraction valve 1102 that is electrically actuated and controls the flow of fluid out of cylinder 138 and accumulator 1104. Each suspension also includes an extension valve 1106 that controls the flow of hydraulic fluid into accumulator 1104 and cylinder 138. Each suspension also has an associated lockup valve 1108 that controls the flow of fluid into or out of accumulator 1104 and a second lockup valve 1110 that controls the flow of fluid into and out of a retraction port of cylinder 138. An orifice 1112 is located in the hydraulic line coupled to one port of cylinder 138 to throttle the flow of fluid into and/or out of that port. In the preferred embodiment shown here the orifice is disposed to regulate flow to and from the extend port of cylinder 138. Orifice 1112 damps the flow of fluid between cylinder 138 and accumulator 1104 and thereby causes cylinder 138 and its accumulator 1104 to act as a suspension shock absorber. In the preferred embodiment, orifice 1112 is fixed. Depending on the needs of a particular application, fixed orifice 1112 could be replaced with a variable orifice, which would allow tuning of the skid steer vehicle suspension system. A check valve 1115 is connected in parallel with orifice 1112 to free flow in one flow direction: into cylinder 138. Damping is thereby provided in one direction: whenever the suspensions are forced upward toward the chassis. It maybe beneficial in some applications to provide such damping in one direction but not in the other.

Depending upon the positions of lockup valves 1108 and 1110, several different operational modes for the skid steer vehicle can be provided. During normal operation over the ground, lockup valve 1108 is open and lockup valve 1110 is open. In this arrangement, the extension port of cylinder 138 is coupled through lockup valve 1108 to accumulator 1104 and to the retraction port of cylinder 138. Both retraction valve 1102 and extension valve 1106 are closed thus preventing fluid from entering or leaving the accumulator/cylinder 138 system of each suspension. As the vehicle is driven over rough ground and the wheels are pushed upward with respect to the vehicle, the pistol in cylinder 138 is forced out the extension port. This causes hydraulic fluid to exit the extension port through orifice 1112, through lockup valve 1108 and into accumulator 1104 and into the retraction port of cylinder 138. Accumulator 1104 acts as a hydraulic spring in the system partially supporting the weight of the skid steer vehicle and absorbing the fluid ejected from the extension port. Fluid flow through orifice 1112 damps the oscillation. When the wheel rebounds after the impact, hydraulic fluid under pressure in accumulator 1104 follows the reverse path through lockup valve 1108 through orifice 1112 and back into the extension port of cylinder 138. With a constant volume of fluid in the accumulator 1104/cylinder 138 system, the skid steer loader will ride at a relatively constant height with cylinder 138 either extending or retracting as the vehicle bounces up and down over rough terrain with a constant payload or total vehicle weight.

When the vehicle's weight changes, such as by filling the bucket with dirt or other material, or by emptying the bucket, the same constant volume of fluid in the cylinder/accumulator system will permit the vehicle to ride lower or higher, respectively. The height of the vehicle above the ground will increase or decrease, and the position of the suspensions with respect to the chassis will change. This is due to the compression of the gas in the accumulator.

The height of the skid steer vehicle can be varied by either adding more fluid to each accumulator 1104/cylinder 138 system or removing fluid from that system. This emptying and filling is provided by retraction valve 1102 and extension valve 1106, respectively. Extension valve 1106 is coupled to a hydraulic supply line 1114, which is connected through valving to hydraulic pump 113. When extension valve 1106 opens, it permits fluid from pump 113 to travel through hydraulic supply line 1114 and into either the extension port of cylinder 138 or the extension port of cylinder 138 and accumulator 1104 if lockup valve 1108 is also open. By filling cylinder 138 and accumulator 1104 of a suspension, that suspension will extend causing the corner of the vehicle to which a suspension is coupled to raise as that suspension is lowered with respect to the chassis.

To lower a suspension, retraction valve 1102 is opened. Retraction valve 1102 is coupled to hydraulic fluid return line 1116, which is in turn connected to hydraulic reservoir or tank 912. When retraction valve 1102 is opened, fluid from the extension port of cylinder 138 (and accumulator 1104 if lockup valve 1108 is open) is exhausted back to tank 912. This causes the suspension to pivot with respect to the vehicle and lower the corner of the vehicle to which the swing arm is attached. As the vehicle is lowered, cylinder 138 retracts. When the vehicle is raised, cylinder 138 extends.

Pump 113 in the preferred embodiment has a fixed specific displacement. Since pump 113 is coupled to engine 104, and since engine 104 runs at a relatively constant velocity, most of the output of pump 113 is not required to fill the accumulators or cylinders 138 of the suspension system. As explained above, during general operation of the vehicle fluid is neither inserted into each accumulator and cylinder pair or removed from them, fluid merely moves from each accumulator to its corresponding cylinder and vice versa. Pump 113 is provided to raise or lower each suspension.

Since pump 113 is preferably a constant displacement pump, its fluid output must be directed somewhere when not used to raise any suspension. It is the function of unloading valve 1118 to dump the excess hydraulic fluid pumped by pump 113. Unloading valve 1118 includes a signal line 1120 that conducts fluid from pump 113 to the right hand end of valve 1118. As pump 113 generates a fluid flow, pressure builds up at its outlet and this pressure is applied through signal line 1120 to the right hand end of valve 1118. This pressure on the right hand end of valve 1118 causes the valve to shift leftwardly opening a flow path to tank 912 through return line 1122. The nominal pressure setting (which is provided by spring 1124) is approximately 60 psi. Assuming that signal valve 1126 (discussed below) is closed, whenever pump 113 generates more than 60 psi of pressure, fluid is conducted through line 1122 back to tank 912.

Whenever any of extension valves 1106 are opened, a fluid flow path is provided into supply line 1114 to that extension valve 1106 and into either cylinder 138 or accumulator 1104 (depending on whether lockup valve 1108 is open or closed). At the same time that controller 808 opens any extension valve 1106, it also opens valve 1126, causing the cylinder pressure of all the cylinders to be applied through check valves 1128 and signal valve 1126 to the left hand end of unloading valve 1118. This, in turn, closes unloading valve 1118 thereby raising the pump pressure (in supply line 1114) to 60 psi above the pressure in the cylinder with the highest pressure. This 60 psi pressure differential is determined by spring 1124.

Signal valve 1126 is a hydraulic valve that opens and closes to permit fluid pressure in any of the cylinders 138 or accumulators 1104 to act against the left hand end of unloading valve 1118. The accumulator or cylinder with the highest pressure transmits fluid through its associated signal check valve 1128 and into common signal line 1130. Note that each of the suspensions is coupled to common signal line 1130 using a signal check valve 1128. In this manner, fluid is prevented from flowing from one accumulator directly into another accumulator or cylinder on another side of the vehicle. Each of the suspensions is maintained with its own independent pressure and fluid volume thereby.

When pressure from an accumulator 1104 or cylinder 138 is introduced into common signal line 1130, it also acts against the left hand end of unloading valve 1118 in cooperation with spring 1124, if signal valve 1126 is energized and is open to permit fluid to pass therethrough. The force balance on unloading valve 1118 ensures that the pump output is always 60 psi (in the preferred embodiment) greater than the maximum pressure in all of the accumulators 1104 and cylinders 138. By providing a constant pressure differential of 60 lbs. per square inch, the flow rate into supply line 1114 is limited to approximately two gallons per minute. This has been calculated to provide a cylinder extension of all of cylinders 138 simultaneously of approximately 1.5 inches per second when raising the suspensions with fluid from pump 113, assuming of course that all of extension valves 1106 are simultaneously opened. By limiting the maximum flow rate into supply line 1114 and thence to the accumulators and cylinders, extremely rapid extensions of the cylinders can be prevented. They will all rise at the same controlled rate.

On occasion, the skid steer vehicle may hit a large bump or other object that might cause a very large pressure increase in the hydraulic lines connecting accumulator 1104 to cylinder 138. These extreme pressures could rupture hydraulic fluid lines or otherwise damage components in the system. For that reason, a pressure relief valve 1132 is provided. This pressure relief valve is coupled between hydraulic fluid return line 1116 and common signal line 1130. Whenever a sudden and extreme pressure spike occurs that is beyond the design operating limits of the suspension system, this pressure relief valve will open and permit the excess pressure to be dissipated by conducting fluid back to tank 912.

All of the valves except unloading valve 1118 and pressure relief valve 1132 shown in FIG. 11 are electrically actuated valves in which the moving valve element is controlled by an electrical solenoid portion of each valve. All of these electrically controlled valves are collectively represented in FIG. 8 as suspension valves 804. The valves are controlled by suspension controller 808, which monitors suspension sensors 802, satellite receiver 817, and accelerometer 816 as well as buttons 614 mounted in joystick 608 under the control of a program stored in the electronic memory of controller 808 to determine which valves should be opened to provide a variety of operating modes. These modes of operation and the programming of suspension controller 808 necessary to provide these modes of operation are described below in conjunction with FIGS. 12–19.

In the preferred embodiment illustrated in FIG. 11, each of the accumulator/cylinder combinations are filled or emptied of fluid, the fluid being hydraulic fluid provided by pump 113. In an alternative embodiment, a pump or pumps capable of pumping air can be connected to the gas side of the accumulator to raise and lower the suspensions by filling or emptying the accumulator of gas. These pumps are preferably electrically driven and would be connected directly to suspension controller 808 in the same manner that the existing hydraulic valves are connected. The accumulator and cylinder could be formed either separately or together as a single body, which would then be provided with a gas (e.g. air) port to receive and exhaust the gas charge of the device. Devices such as "air shocks" (i.e. integral shock absorbers with a pressurized gas spring) would be particularly suitable.

Figure 12:
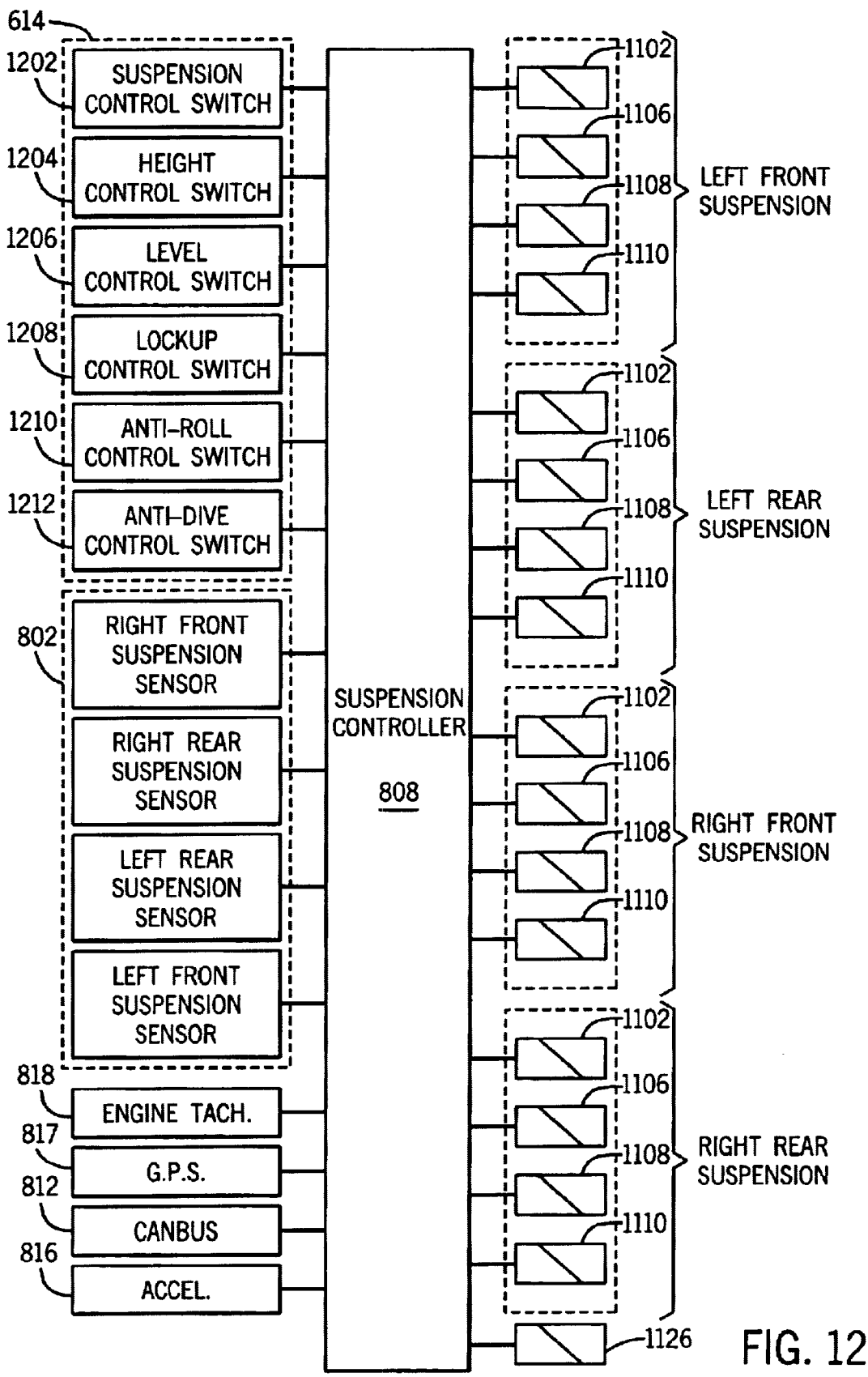
FIG. 12 is a detailed schematic of the suspension controller and the various suspension valves, sensors and operator switches to which it is connected.

FIG. 12 illustrates a suspension controller together with details of the particular components to which it is connected. These components include buttons or switches 614, suspension sensors 802, suspension valves 1102, 1106, 1108, and 1110 for each of the left front, left rear, right front, and right rear suspensions. They also include signal valve 1126, speed sensor (e.g. engine tachometer) 818, accelerometer 816, satellite receiver 817, and CAN bus 812.

There are six buttons or switches 614 that are coupled to suspension controller 808. These include suspension control switch 1202, height control switch 1204, level control switch 1206, lockup control switch 1208, anti-roll control switch 1210, and anti-dive control switch 1212. Each of these switches are provided (preferably on joystick 608), to permit the operator to signal suspension controller 808 of the desired mode of operation of each of the suspension valves 1102, 1106, 1108, 1120, and 1126.

Suspension control switch 1202 is a rocker switch with three positions, ON, OFF, and TRANSPORTATION with the OFF position at the middle. The ON position has a green LED light that shows the status of the suspension control. The switch is spring returned to the OFF position, which is the default. The ON position is momentary on when pressed. The TRANSPORTATION position is latched on when pressed.

Height control switch 1204 is a rocker switch with three positions (RAISE, OFF, and LOWER) with the OFF position in the middle. The switch is spring returned to the OFF position, which is the default. Both of the RAISE and LOWER positions are momentary on when pressed.

Level control switch 1206 is a rocker switch with three positions, AUTOMATIC, OFF, and MANUAL with the OFF position at the middle. The switch is spring returned to the OFF position, which is the default. The MANUAL position is momentary on when pressed. The AUTOMATIC position is latched on when pressed.

Lockup control switch 1208 is a rocker switch with three positions, AUTOMATIC, OFF, and MANUAL with the OFF position at the middle. The switch is spring returned to the OFF position, which is the default. The MANUAL position is momentary on when pressed. The AUTOMATIC position is latched on when pressed.

Anti-rolling control switch 1210 is a rocker switch with two positions, ON and OFF. Both positions are latched on when pressed.

Anti-diving control switch 1212 is a rocker switch with two positions, ON and OFF. Both positions are latched on when pressed.

Whenever the skid steer vehicle is turned off, and the electronic control system 800 is de-energized, each of the suspension valves 1102, 1106, 1108, 1110, and 1126 are also de-energized. Since these valves receive their power from suspension controller 808, when power is removed from suspension controller 808 that power is no longer applied to any of these valves. As a result, the valves return to their default, de-energized positions. Valves 1102, 1106, 1108, 1110 and 1126 are closed whenever they are de-energized. As a result, hydraulic fluid neither enters nor leaves cylinder 138. With lockup valve 1108 closed, cylinder 138 is disconnected from accumulator 1104. With both of valves 1102 and 1106 closed, hydraulic fluid cannot escape cylinders 138 back to either pump 113 or tank 912 (see FIG. 11). In effect, all flow into or out of each of cylinders 138 is blocked and the position of the four suspensions is fixed. Each of the swing arms in the suspension is no longer capable of pivoting with respect to the vehicle.

When the skid steer vehicle is initially started and the electronic control system 800 is energized, the skid steer vehicle stays in this rigid state with fixed swing arms until the operator affirmatively selects a different operating mode. On initial start up, the vehicle neither rises on its suspensions nor falls on its suspensions and remains fixed at the same height it had when it was de-energized. To leave this initial, fixed, start up mode the operator must press suspension control switch 1202. During operation, suspension controller 808 polls all of the switches 1202, 1204, 1206, 1208, 1210 and 1212 at a rate of about 100 hertz, or once every 10 milliseconds. In this manner, suspension controller 808 is continuously aware of any operator manipulations of any of the switches. In the initial start up mode, however, suspension controller 808 will not respond to any of switches 1204, 1206, 1208, 1210, or 1212 until the operator selects a particular mode of operation by manipulating suspension control switch 1202.

Suspension control switch 1202 can select three modes of operation: an operating or "ON" mode, an "OFF" mode, or a "TRANSPORTATION" mode. In the "OFF" mode, the suspensions remain fixed with respect to the chassis at all times. The suspensions are locked up. Suspension control switch 1202 has two latched positions: the OFF position, which is the spring-loaded default position, and the TRANSPORTATION position. The ON position is a momentary contact position and thus can only be signaled by active operator intervention. When the vehicle is started with the suspension control switch 1202 in either the TRANSPORTATION position or the OFF position, suspension controller 808 keeps the suspension valves closed and polls switch 1202 until the operator moves it to the "ON" position.

Suspension controller 808 polls suspension control switch 1202 to determine whether the operator has moved the switch from either the transportation or the OFF position to the ON position. Once the suspension controller senses that the switch is in the ON position, it continues polling the switches while incrementing a counter in memory until the operator releases the switch and the switch no longer indicates the ON position. Once the operator has released the suspension control switch and it returns to the OFF position, suspension controller 808 compares the value of the counter with a predetermined value that is indicative of the suspension control switch having been held in the ON position continuously for a period of about 10 seconds. If as a result of this comparison the suspension controller determines that the switch was held down for a period of greater than 10 seconds, the suspension controller enters into a diagnostic mode of operation. On the other hand, if as a result of this comparison suspension controller 808 determines that the ON switch was held down for less than 10 seconds, the suspension controller responsively enters into the "ON" or operating mode.

If the operator manipulates suspension control switch 1202 to the TRANSPORTATION position, suspension controller 808 senses the switch position and opens all four retraction valves 1102 to bleed hydraulic fluid from the extension port of each of cylinders 138. Each of retraction valves 1102 opens to a degree sufficient to permit all four suspensions to simultaneously lower the skid steer vehicle at a rate of between 0.25 and 5.0 inches per second. More preferably, retraction valves 1102 are opened to permit the skid steer vehicle to lower at a rate of between 0.5 and 2.5 inches per second. Even more preferred is for retraction valves 1102 to open an amount sufficient to permit the skid steer vehicle to lower at a rate of between 1.0 and 2.0 inches per second.

This lowering continues until cylinders 138 are no longer supporting the weight of the vehicle and the vehicle rests on mechanical stops (not shown) that prevent further upward movement of the swing arms with respect to the chassis. At this point, due to the engagement of mechanical stops with each of the swing arms of the four suspensions, the vehicle stops lowering and stays at its lowest stationary height.

In the preferred embodiment of the skid steer vehicle, the suspension controller 808 automatically de-energizes each of the retraction valves 1102 a predetermined period of time after the operator has moved the suspension control switch to the TRANSPORTATION position. This time is calculated to be of a length sufficient to permit the skid steer vehicle to be completely lowered until the swing arms abut their mechanical stops thereby preventing any further downward movement of the skid steer vehicle. With the retraction valves 1102 de-energized, they return to a closed position and therefore fluid can neither enter nor leave cylinders 138. In an alternative embodiment of suspension controller 808, the suspension controller monitors this lowering process by reading each of the four suspension sensors 802, of which one is associated with each of the four suspensions of the vehicle. When each suspension reaches its lowermost position, either because it is supported by its torsion bar alone, or, in the event the system is not equipped with a torsion bar, because each suspension is resting upon a mechanical stop that prohibits further downward motion, suspension controller 808 determines that the skid steer vehicle has stopped lowering. In this embodiment, controller 808 determines this by comparing successive values of data received from suspension sensors 802. When each suspension stops moving downward as indicated by no change in successive readings from the suspension sensor, suspension controller 808 de-energizes the retraction valve 1102 associated with that suspension thereby locking that suspension in its lowered position.

Once the skid steer vehicle has been turned on by briefly toggling the suspension control switch to the ON position (described above), suspension controller 808 is programmed to respond to operator manipulation of the height control switch 1204, the level control switch 1206, the lockup control switch 1208, the anti-roll control switch 1210, and the anti-dive control switch 1212 in specific ways that enhance the operation of the skid steer loader. This programming is discussed below.

Figure 13:
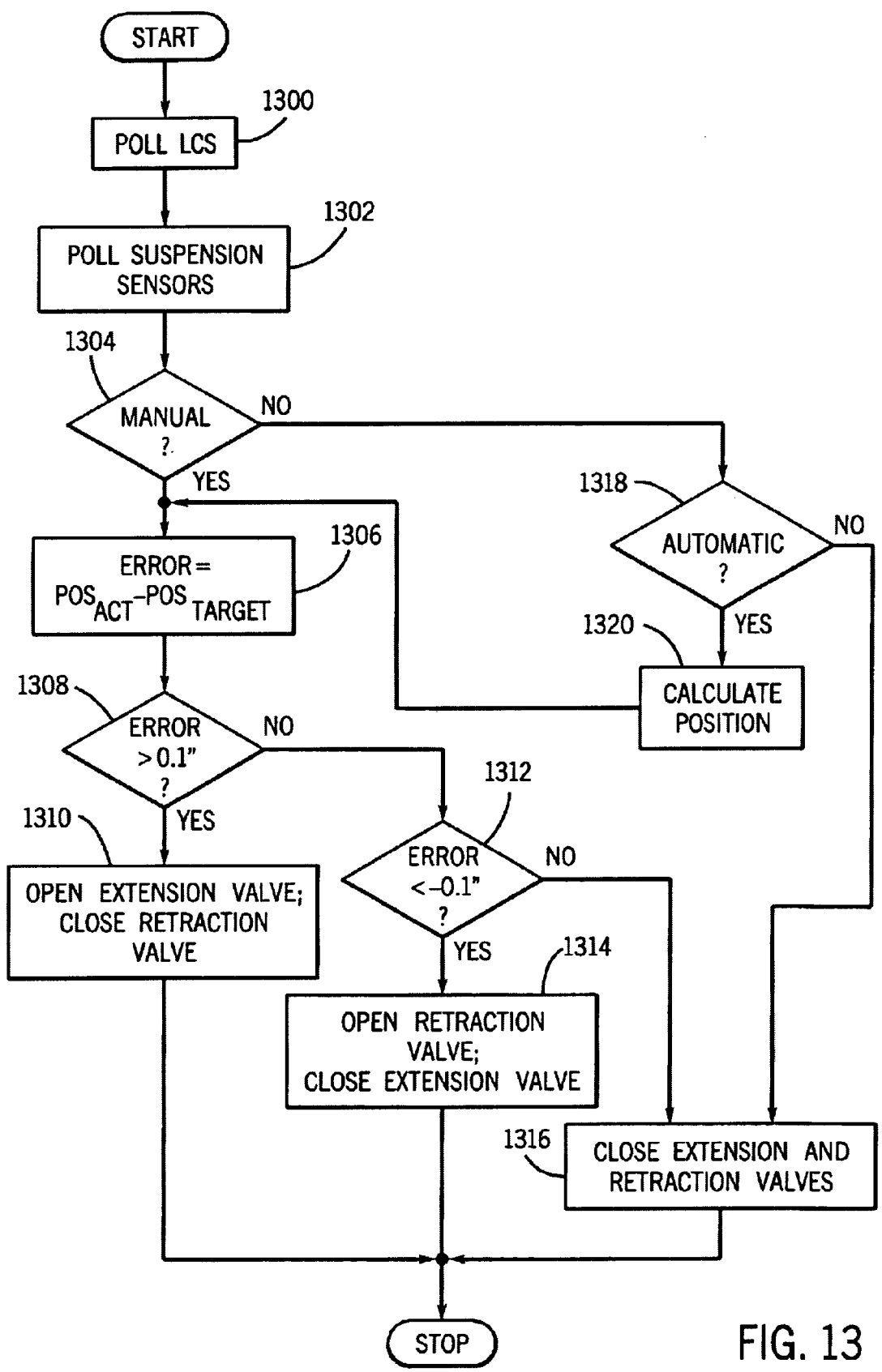
FIG. 13 is a flow chart illustrating the programmed operation of the suspension controller when it self-levels and controls the height of the vehicle suspensions by raising and lowering each suspension.

FIG. 13 illustrates the programming and operation of the level control switch and the suspension controller 808. When suspension controller 808 polls the level control switch (LCS) in the operating mode, it is programmed to determine what position the level control switch is in and based upon that position, adjusts the height of the skid steer vehicle with respect to the ground. It does this by filling or emptying cylinders 138 and/or accumulators 1104. To raise a suspension, suspension controller 808 opens extension valve 1106. To lower a suspension, suspension controller 808 opens retraction valve 1102.

In FIG. 13 this process and the programming of suspension controller 808 are illustrated. This loop is executed at the overall polling rate of the suspension controller mentioned above: approximately once every 10 milliseconds.

In step 1300 suspension controller 808 polls the level control switch and determines the position of that switch, whether in the MANUAL position, the OFF position, or the AUTOMATIC position. The operator must actively hold the level control switch in the MANUAL position. Once placed in the AUTOMATIC position, a switch detent holds it in that position until released by the operator to return to the OFF position. The OFF position is the default position for the switch. In block 1302 suspension controller 808 polls the suspension sensors and receives a signal indicative of the position of each suspension with respect to the chassis (and therefore indicative of the position of each corner of the chassis with respect to the ground).

In block 1304, the suspension controller determines whether LCS 1206 is in the MANUAL position. If it is in the MANUAL position, processing continues to block 1306 in which the suspension controller calculates the position error for each of the four suspensions of the vehicle. Suspension controller 808 has at least one target height for the suspensions stored in its electronic memory as a digital value.

In block 1306 suspension controller 808 determines the suspension error for each of the suspensions. This error is indicative of the difference between the actual height of the suspension ($POS_{ACT}$) and the desired or target height of the suspension ($POS_{TARGET}$). An error value is preferably calculated for each of the four suspensions to permit each of the four suspensions to be raised or lowered independently of the others.

In block 1308 suspension controller 808 determines whether any of the four position errors (one for each of the suspensions) is greater than a threshold value. In the preferred embodiment, this value is equivalent to approximately a 0.10 inch. If the error for any suspension is greater than a 0.10 inch, suspension controller 808 proceeds to block 1310.

In block 1310, suspension controller 808 opens the extension valve for any of the suspensions that have an error greater than the predetermined value. It also closes the retraction valve for these suspensions (if necessary).

Opening the extension valve and closing the retraction valve for the suspensions raises those suspensions. By "raised" we mean that the cylinders 138 associated with the suspensions at the erroneous heights are extended lowering the wheels with respect to the chassis of the skid steer vehicle and hence (since the wheels are resting on the ground) raising the skid steer vehicle higher above the ground at that suspension.

If in block 1308, any of the suspensions were not in error greater than the predetermined value, suspension controller 808 proceeds to block 1312 and determines whether the suspensions have a position error less than the predetermined value. In this embodiment, the predetermined value is equivalent to a distance of 0.10 inch. For the suspensions having a position error of less than −0.1 inch, their retraction valves are opened and their extension valves are closed in block 1314.

Some suspensions may fall within the +/−0.1 inch error band checked in blocks 1308 and 1312 by the suspension controller. These suspensions (if any) are in the proper position and therefore do not need to be either lifted or lowered. For these suspensions, suspension controller 808 closes both the extension and retraction valves as shown in block 1316 in FIG. 13.

Referring back to block 1304 in FIG. 13, if suspension controller 808 determines that LCS 1206 is not in the MANUAL position it then proceeds to determine whether the LCS is in the AUTOMATIC position in block 1318. The MANUAL position is typically used when the vehicle is stopped and none of the suspensions are pivoting up or down. The advantage of a MANUAL position is that the operator, standing still, can simultaneously raise and/or lower all of the suspensions to a predetermined suspension height. The advantage of the AUTOMATIC position is that the height of each suspension can be dynamically varied as the vehicle moves over the ground without operator intervention.

This automatic leveling poses a problem, however, that is not posed by operation of the system in the MANUAL mode. Since the skid steer vehicle may move over the ground in the AUTOMATIC mode (although it will also work when the vehicle is stationary) all four of cylinders 138 and the swing arms to which they are coupled move rapidly up and down typically over a range of 4–8 inches. If suspension controller 808 opened and closed the retraction and extension valves for each suspension as fast as each of the suspensions was bouncing up and down, a tremendous amount of hydraulic fluid would be injected into the accumulators and cylinders 138 and extracted from the accumulators and cylinders 138. Assuming a sufficient amount of hydraulic fluid from pump 113 the suspension controller could actually stop all up and down movement of all four suspensions holding them within the error band of plus or minus 0.1 inch. In effect, all of the suspensions would be rigid, moving neither up nor down with respect to the vehicle. This is not the way suspension controller 808 is configured to operate when the LCS is in the automatic mode. Vehicle operators need the continuous springing capability of all four suspensions to absorb shocks and smooth the ride of the vehicle. What they do not want is a vehicle that travels over the ground and, on average, is tilted or at the wrong height. It is the average position or height of each suspension that needs to be controlled in the automatic mode and it is this average height or position that suspension controller 808 indeed controls.

To control the average height while still permitting each suspension to pivot with respect to the ground, suspension controller 808 calculates the average position of each suspension in block 1320. In one embodiment, suspension controller 808 does this by calculating a moving average of the position/height of each of the four suspensions and setting $POS_{ACT}$ equal to this average value for each suspension. It does this by combining a series of heights for each suspension gathered in a succession of cycles through the level control loop shown in FIG. 13. In the simplest arrangement, successive heights for each of the suspensions are gathered in block 1302 and are added to previously gathered heights for each suspension gathered in previous passes through the FIG. 13 control loop. Since the desired actual frequency of the skid steer vehicle (i.e. its frequency of "bouncing" as it travels over the ground) is on the order of 0.5–1.5 hertz, the successive suspension sensor 802 measurements required to determine the average height of each suspension of the skid steer vehicle will be averaged or otherwise combined over an interval of at least 0.5 seconds. More preferably, they will be averaged or otherwise combined over an interval of at least 1.0 second. Even more preferably, they will be averaged or otherwise combined over an interval of at least 2.0 seconds.

It is not necessary that all values measured over this interval be used to determine the average actual height or position of each suspension. For example, although the polling loop shown in FIG. 13 may retrieve suspension sensor 802 values every 10 milliseconds, thus generating a set of 100 (×4 since there are four suspensions) suspension values every second, it may not be necessary to use every one of these values. For example, every other value may be used or every $5^{th}$ value, or every $10^{th}$ value. Since the average height over a period of 0.5 seconds to as much as 10 seconds is being calculated, sufficient accuracy in the average suspension position can be maintained while reducing the processing demands on suspension controller 808 by eliminating many intermediate suspension sensor values.

Surprisingly, it has been determined that the best performance of the level control process shown in FIG. 13 can be achieved by using the same algorithm for calculating the average position of the suspensions for all the suspensions. Thus, suspension controller 808 preferably samples each of the suspension sensors at the same rate: the same number of times per second. Similarly, it is preferable if suspension controller 808 combines the same number of suspension values for each suspension in determining the average position of each suspension. In addition, it is preferable that suspension controller 808 skip the same number of suspension sensor values for each of the four suspensions when calculating the average position. Furthermore, it is preferable that the suspension controller 808 use the same number of suspension sensor values when calculating the average position of each of the four suspensions.

Once the average position of each suspension has been calculated and $POS_{ACT}$ for each suspension has been set equal to this average position in the memory of suspension controller 808, processing returns to block 1306 and the valves controlled as shown in blocks 1308–1316.

Another switch that suspension controller 808 polls in its polling loop is the lockup control switch 1208. The lockup control switch has three positions: AUTOMATIC, OFF and MANUAL. The MANUAL position is momentary contact position and is engaged only for so long as the operator physically holds the switch in the MANUAL position.

FIG. 14 is a flow chart of the operations performed by suspension controller 808 whenever the operator manipulates lockup control switch 1208 and suspension controller 808 is in the operating mode (in which it polls switches 614). The program steps shown in FIG. 14 are executed every time controller 808 executes the 10 millisecond polling loop. In block 1400, suspension controller 808 polls the lockup control switch. In block 1402 suspension controller 808 determines whether the lockup control switch is in the MANUAL position. If so, controller 808 sets a flag in its memory indicating this fact. This is shown in block 1404 of FIG. 14. If the lockup control switch is not in MANUAL, controller 808 proceeds to block 1406 in which it determines whether or not the lockup control switch is in the AUTOMATIC position. If the switch is in the AUTOMATIC position, suspension controller 808 proceeds to block 1408 in which it checks the vehicle speed. The vehicle speed is provided to suspension controller 808 in a variety of ways. First, suspension controller 808 may calculate vehicle velocity based on the position data received from satellite receiver 817. It may also calculate vehicle velocity based on the speed of one or more of the motor speed sensors 820. Alternatively, it may receive a signal indicative of the specific displacement of variable displacement motors 106 and 108 from drive controller 814 over the CAN bus. Alternatively, it may use the commanded specific displacement of motors 106 and 108 that are generated by drive controller 814. This data from one controller to another controller is provided over CAN bus 812. Any one of the foregoing values will provide a signal indicative of the vehicle velocity.

In block 1410, the suspension controller compares the vehicle speed with a predetermined speed, $V_{set}$, to determine whether the vehicle has exceeded the predetermined speed. If so, suspension controller 808 proceeds to block 1412 in which it sets a flag in memory that indicates that the speed has been exceeded. If the speed does not exceed the predetermined speed, the flag is not set as shown by flow path 1414. Suspension controller 808 then proceeds to block 1416 in which it checks the position of the left joystick. The left joystick is the manually operated control manipulated by the operator in order to raise and lower the loader arms or tilt the bucket. This joystick position signal is generated by loader controller 810 (FIG. 8), which is coupled to the left joystick and is primarily responsible for opening and closing loader valves 806. Loader controller 810 packetizes the joystick position data received from joystick 606 and places it on CAN bus 812. Suspension controller 808 is also coupled to CAN bus 812 and receives this packet of joystick position data. Thus, the joystick position data checked in block 1416 is generated by a second controller and is transmitted to the suspension controller over a serial communications bus. In the preferred embodiment the joystick position data is a numerical value indicative of the degree of deflection of the joystick in either the x-direction or the y-direction or both directions. Thus, it is indicative of an operator command to either raise or lower the loader arms, or to tilt the bucket either outward (in a direction that tends to dump the bucket) or inward in the opposite direction. ##

In block 1418, suspension controller 808 examines the joystick position data to determine whether it is indicative of operator movement of the joystick. If the joystick position data indicates that the operator has moved the joystick, suspension controller 808 proceeds to block 1420 and sets a flag in memory indicating that the operator is manipulating the joystick. If the operator has not moved the joystick, processing bypasses block 1420 and the joystick flag is not set, as indicated by program flow path 1422. Suspension controller 808 may lock the suspensions if there is joystick movement in a direction that raises or lowers the loader arms. It may lock the suspensions if there is movement of the joystick in the orthogonal direction (i.e. a direction to tilt or curl the bucket), or it may lock the suspensions if there is movement in either of the two directions.

Joystick 606 may alternatively provide a separate electrical signal that indicates merely that the joystick has been moved away from the neutral position but does not indicate the magnitude or direction of deflection. This signal can alternatively be used in block 1418. While this signal does not provide the additional information of how far the joystick has been moved (i.e. it does not include data indicative of the degree of deflection of the joystick) it does indicate that the operator has moved the joystick and therefore has commanded either the loader arms or the bucket to move.

All the preceding steps are joined and merged in block 1424. At this point in program execution, the suspension controller has set the manual flag if the lockup control switch was in the manual position, it has set the speed flag if the lockup control switch is in the automatic position and the vehicle exceeds a predetermined speed, and it has set the joystick flag if the operator has moved a manual operator input device that would move the loader arms, the bucket, or both. In step 1424 suspension controller 808 looks at each flag to determine whether one or more flags has been set. If any flag has been set, suspension controller 808 proceeds to block 1426 in which it closes all of lockup valves 1108. By closing lockup valves 1108, flow between cylinders 138 and their associated accumulators is blocked. In this manner, all four suspensions are locked up and the swing arms of the suspensions are no longer permitted to spring with respect to the chassis. This lock up in effect eliminates the springing of the swing arms (and hence the wheels) with respect to the chassis. In an alternative embodiment, controller 808 may only lock up the left front and right front suspensions in block 1426.

If no flags were set, suspension controller 808 proceeds to block 1428 in which it commands lockup valves 1108 to open. When lockup valves 1108 are opened, each of cylinders 138 are again connected to their associated accumulators and are therefore permitted to extend and retract. This permits the swing arms to pivot with respect to the vehicle. After execution of either of blocks 1426 or 1428 suspension controller 808 proceeds to block 1430 in which it resets the manual flag, the speed flag, and the joystick flag in preparation for its next pass through the polling loop illustrated in FIG. 14.

The lockup control switch permits the operator to instantly lock the suspensions whenever he holds the switch in the MANUAL position. As soon as he releases the switch, all else being the same, the suspensions are immediately released and provide spring damping. In addition, by placing the lockup control switch in the AUTOMATIC position, the suspension is locked whenever the vehicle falls below a predetermined speed. The speed is preferably about 2 mph. The final feature provided by the lockup control switch when it is placed in the AUTOMATIC position is that of locking up the suspension whenever the operator commands movement of the loader arm and bucket, or any implement used in place of the bucket.

It should be recognized that "locking up" the suspensions does not mean that the suspensions are fixed in position, but that the springing of the suspension has been substantially reduced or eliminated. This is achieved in the present embodiment by preventing fluid from flowing between the cylinders and their associated accumulators—the circuit element that (together with or in place of the torsion bars 320) provides suspension springing.

The suspensions can be "locked" yet still move with respect to the chassis when (1) the valve connecting the cylinder with its accumulator is closed, and (2) the automatic leveling feature provided by lead control switch 1206 is engaged. When the operator moves the lockup control switch 1208 to the MANUAL or AUTOMATIC position with the automatic leveling feature engaged, the accumulators are disconnected from their cylinders thus eliminating or reducing suspension springing, yet controller 808 can still fill or empty the cylinders to gradually move all of the suspensions to their predetermined height. In this manner, if the suspension is locked while the wheels are at different positions, the controller can adjust their positions as described above in conjunction with FIG. 13. This automatic leveling with the suspension locked may be done to insure that the four wheels are all at the same height.

FIG. 15 illustrates the process performed whenever suspension controller 808 is in the "ON" or operating mode. In FIG. 15, the steps performed by suspension controller 808 when it polls the height control switch are indicated.

The height control switch 1204 is a momentary contact toggle switch having a central neutral or "OFF" position and two opposed toggle positions "UP" and "DOWN." When the operator pushes switch 1204 in one direction away from the neutral or "OFF" position, he moves the switch to the "UP" position. When the operator pushes the switch in the opposite direction from the neutral or "OFF" position he moves it to the "DOWN" position.

The first operation executed by suspension controller 808 is to poll the height control switch 1204 in block 1500. Suspension controller 808 does this as part of its every 10 millisecond polling loop. Controller 808 then determines in block 1502 whether the height control switches in the "UP" position. If controller 808 determines that the switch is in the "UP" position, program execution continues to block 1504.

In block 1504, suspension controller 808 increments the desired vehicle suspension heights of all the suspensions in the vehicle by a predetermined height value of "K." This value is preferably equivalent to 0.25 inches. Once the target height, i.e. the desired position of the suspension, has been incremented, controller 808 processing continues to block 1506 in which controller 808 determines whether the new suspension height requested by the operator exceeds a maximum suspension height. In other words, the suspension height of the vehicle is not infinite. The suspension can be raised or lowered with respect to the vehicle (i.e. the vehicle can be lowered or raised with respect to the ground) only over a predetermined range of heights that is a function of the particular shape and configuration of the suspension components. Typically, a skid steer vehicle such as the skid steer loader shown in FIG. 1 can be raised and lowered over a range of perhaps six inches. If the operator attempts to set a desired target height that is outside this range, by adding the value "K" to the current desired or target height, controller 808 will set the target height ($POS_{TARGET}$) to the highest permissible height.

If in block 1502 controller 808 determines that the switch is not in the "RAISE" position, processing continues to block 1508. In block 1508 suspension controller 808 determines whether the height control switch is in the "LOWER" position. If it is, controller 808 continues and executes block 1510.

In block 1510, suspension controller 808 decrements the desired or target height of the four suspensions by the predetermined height value "K". Once suspension controller 808 has decremented the target height, processing continues to block 1512 in which suspension controller 808 checks the newly decremented target height to determine whether it is outside the acceptable range of heights stored in the memory of suspension controller 808. If, by decrementing the target height an amount "K" in block 1510, the target height falls outside of this range, suspension controller 808 will set the desired or target height ($POS_{TARGET}$) to the lowest permissible height. In this way, no matter how long or how many times the operator presses the height control switch, either to raise or to lower the suspension, the target height will remain within an acceptable operating range or presettable suspension heights. The upper and lower height limits are saved in the electronic memory of suspension controller 808.

Returning back to block 1508, if suspension controller 808 determines that the height control switch is not in the "LOWER" position, the program illustrated in FIG. 15 terminates as shown by flow path 1514 which bypasses blocks 1510 and 1512 and goes directly to the termination block 1516.

Suspension controller 808 executes block 1518 whenever the operator presses the height control switch. Whenever the operator presses the height control switch either to RAISE or to LOWER, it indicates that the operator has selected a new target height for the vehicle suspensions. Suspension controller 808 sets a flag in memory, the "RAISE/LOWER" flag, to 1 to indicate that the operator has changed the target height of the vehicle.

FIG. 16 illustrates another computer program executed by suspension controller 808. In block 1600, suspension controller 808 checks to determine whether the "RAISE/LOWER" flag has been set to "1". If it has not been set, the program of FIG. 16 terminates. On the other hand, if the "RAISE/LOWER" flag has been set, program execution continues to block 1602 in which the suspension controller 808 determines whether the operator is holding the level control switch 1206 in the MANUAL position. If so, the program in FIG. 16 also terminates. If the operator is not holding level control switch 1206 in the MANUAL position, the program continues to block 1604 in which the suspension controller 808 determines whether the level control switch is in the AUTOMATIC position. If it is in the AUTOMATIC position, the program of FIG. 16 terminates.

The reason that suspension controller 808 checks to determine the level control switch position is that if the level control switch is in either the MANUAL or the AUTOMATIC position, the routine shown in FIG. 13 will accommodate the change in the target height ($POS_{TARGET}$) by automatically controlling the level of the vehicle. In other words, whenever the operator changes the target height as described above in conjunction with FIG. 15, that changed target height is automatically used in block 1306 (FIG. 13) to control the level/height of the vehicle if the level control switch 1206 is either in the MANUAL or AUTOMATIC position. Block 1602 and 1604 indicate to suspension controller 808 whether the level control routines of FIG. 13 are actually being executed. If they are, then there is no need to control the height as shown in FIG. 16. The programmed operation of FIG. 13 will control the height.

On the other hand, if the level control switch is "OFF" (i.e. not in the MANUAL or AUTOMATIC position), the routine of FIG. 16 will adjust the height as requested by the operator using height control switch 1204 (see FIG. 15).

Referring back to FIG. 16, if the level control switch is "OFF" (not MANUAL or AUTOMATIC) processing continues to block 1606. Block 1606 indicates the beginning of a control loop that is executed once for each suspension in the skid steer vehicle. In the preferred embodiment there are four independent suspensions, and therefore this control loop is executed four times: once for each suspension of the skid steer vehicle. The suspension that is being controlled is indicated by the value of the variable "CYL". The first time through this loop CYL is set to "1", the second time through it is set to "2", the third time through it is set to "3", and the fourth time through it is set to "4". These values 1 through 4 indicate the suspension that is currently being controlled. In block 1608, suspension controller 808 determines the position (height) error for the current suspension being corrected. Controller 808 determines the height of the suspension ($POS_{CYL}$) by reading the suspension sensor 808 for that suspension. In block 1610, the suspension controller 808 determines whether the position error ($ERR_{CYL}$) for that suspension is greater than a predetermined value, here shown as 0.10 inches. This predetermined value is indicative of that suspension being more than a 0.10 inches below the target position ($POS_{TARGET}$) for that suspension. In addition, in block 1610 suspension controller 808 determines whether a flag value for that suspension ($FLAG_{CYL}$) equals one. The flag value for the suspension indicates whether the suspension associated with that cylinder has been raised (or lowered) to the proper height. If the test of block 1610 is true, processing by suspension controller 808 continues to block 1612 in which suspension controller 808 opens the extension valve 1106 and closes the retraction valve 1102 for the suspension being raised. Suspension controller 808 continues to block 1614 in which it checks whether the suspension being corrected is too high. Suspension controller 808 determines whether the position error for the suspension being checked is less than a predetermined value, here shown as −0.10 inches or a 0.1 inches above the target position for that suspension. Suspension controller also checks the cylinder flag for that suspension to see whether the suspension has already been corrected. If the suspension is more than a 0.1 inches above the target position and the suspension has not already been corrected, suspension controller 808 continues to block 1616 in which it opens the retraction valve 1102 and closes the extension valve 1106 for the suspension being corrected.

The final check performed by suspension controller 808 is illustrated in block 1618 of FIG. 16. In this block, suspension controller 808 determines whether the suspension being corrected is within a predetermined error band of the desired or target position. In the preferred embodiment (explained above) this is equal to +/−0.1 inches. If the suspension being corrected is within the acceptable position error band of the vehicle, the flag value ($FLAG_{CYL}$) for that suspension is set to zero and both the extension and retraction valves are closed as indicated in block 1620. By setting the cylinder flag equal to zero for the suspension being corrected, no more corrections are made to that cylinder.

The cylinder flag set to zero in block 1620 is used in block 1610 and 1614 to determine whether suspension controller 808 should open or close the extension or retraction valves. The effect of this is simple. Once each suspension reaches the target height or position, or rather an acceptable error band around the target position, no more corrections are made to that suspension.

Block 1622 indicates the end of the position control loop for the suspensions. Suspension controller 808 moves on to the next suspension (i.e. returns to block 1606) and repeats the steps of blocks 1608–1620 for the next suspension. Again, the sequence of programmed operations shown in block 1608–1620 is executed for each of the four suspensions in the vehicle. Once all of the suspensions have been corrected, suspension controller 808 continues to block 1624 in which it determines whether each of the suspension flags have been set to zero, indicating that all the suspensions have been properly moved to the new target height indicated by the height control switch in FIG. 15. Once all four suspensions have been properly raised into the acceptable error band around the target position, as determined in block 1624, the vehicle height (i.e. all four suspensions) is considered to be set to the new target position and the operations in FIG. 16 will no longer be executed, at least until the operator again presses the height control switch. This is indicated in block 1626, in which suspension controller 808 sets the raise/lower flag to zero and sets each cylinder flag for each of the four suspensions back to "1". The next time the routine shown in FIG. 16 is executed, suspension controller 808 will process block 1600, will determine that the raise/lower flag is set to zero, not "1", and will exit the routine of FIG. 16. The routine of FIG. 16 will not be executed again until the operator again changes the target height or position of the suspensions (see FIG. 15 and accompanying text) in which he again sets the raise/lower flag to "1".

The level control switch and the height control switch offer similar functions. The level control switch, when moved to the MANUAL position causes each of the suspensions to be driven to their associated target positions. When the level control switch is placed in AUTOMATIC position, controller 808 is programmed to drive the suspensions to their target position until the level control switch is manually released from the AUTOMATIC position.

The height control switch on the other hand when manipulated to either the RAISE or the LOWER position is configured to change the target position of each of the four suspensions and, if the level control switch is turned OFF, to move each suspension individually to the new target position and then to automatically disengage. By "disengaging" we mean that once the suspensions are at their new target positions at least once, there is no further MANUAL or AUTOMATIC height correction unless the operator turns the level control switch to "MANUAL" or to "AUTOMATIC". On the other hand, if the level control switch is in the AUTOMATIC position, each suspension will be continuously controlled at the new target position selected in blocks 1504 or 1510.

FIG. 17 illustrates another portion of the program executed by suspension controller 808 whenever the controller is in the operating mode. The programmed steps shown in FIG. 17 are executed every time suspension controller 808 executes its 10 millisecond polling loop. The overall function of the steps illustrated in FIG. 17 is to throttle the lockup valve 1108 associated with each suspension to further restrict the flow rate of fluid out of each cylinder 138 and into its associated accumulator 1104.

During normal operation with controller 808 in its "ON" or operating mode, lockup valve 1108 is usually open and suspension damping is provided by orifice 1112. When operating over very rough ground, however, fluid maybe forced out of cylinders 138 at such a rate that the cylinders approach complete retraction or compression. Typically, a mechanical stop will be provided between the swing arms and the chassis of the vehicle to protect the cylinder from the sudden impact of the piston against the cylinder end cap. Nonetheless, the sudden impact of the swing arm against its mechanical stop may damage the swing arm or the chassis of the vehicle. For this reason it is desirable that in the event the mechanical stops are approaching each other to further restrict hydraulic fluid flow out of cylinder 138 into accumulator 1104 beyond the restriction provided by orifice 1112. By further restricting flow out of cylinder 138, it is possible to slow the swing arm down as it approaches its mechanical stop thereby lessening or even eliminating the arm-to-stop impact. To achieve this additional damping, suspension controller 808 executes the program portion identified in FIG. 17. This program constantly monitors the positions of the four suspensions and is executed every 10 milliseconds or so. When the swing arms approach the upper limit of their travel, suspension controller 808 modulates lockup valves 1108 causing them to close slightly and add to the flow restriction provided by orifice 1112. This causes the pressure in cylinder 138 to rise more rapidly and slow the swing arms as they approach their mechanical stops.

Referring now to FIG. 17, in block 1700 suspension controller 808 polls each of the suspension sensors to determine the position of each of the swing arms with respect to the chassis. In block 1702 suspension controller 808 enters a control loop that is executed four times, once for each of the four suspensions in the skid steer vehicle. In block 1704, suspension controller 808 determines how close the suspension being tested is to complete compression. In block 1704, TOP is a constant equivalent to the position of the suspension when cylinder 138 is collapsed, $POS_{cyl}$ is a value indicative of the actual position of the suspension being tested, TOP_CLEARANCE is the value calculated by suspension controller 808 indicative of the difference between these values. It indicates the remaining amount of upward travel of the swing arm before it is mechanically stopped. Once suspension controller 808 has calculated this clearance, it proceeds to block 1706 in which it compares this clearance value with a predetermined value (here shown as 1 inch) to determine whether the suspension is within a predetermined distance of permissible upward suspension travel. In the preferred embodiment, shown here, the answer to block 1706 is "yes" when the suspension being tested has less than one more inch of upward travel.

If the suspension is within this predetermined distance, suspension controller 808 then executes block 1708. In block 1708 suspension controller 808 modulates the electrical signal provided to lockup valve 1108 to partially close lockup valve 1108. This provides an additional flow restriction to fluid forced out of cylinder 138. This raises the pressure in cylinder 138 and acts to slow the upward suspension travel. In the preferred embodiment, lockup valve 1108 is connected to a pulse width modulated drive circuit in suspension controller 808 and is itself a proportional control valve that can throttle flow proportional to the magnitude of the PWM signal that suspension controller 808 applies to it.

Once suspension controller 808 has reduced the flow rate through lockup valve 1108 by throttling it, it proceeds to block 1710 and loops back to block 1702. Suspension controller 808 then executes the same steps of block 1704, 1706, and 1708 for the next suspension. This process is repeated two more times, and therefore independently throttles each of the lockup valves 1108 on each of the suspension's based upon that suspensions relative rotational position.

Referring back to block 1706, it may be the case that a suspension is not within the predetermined distance. If this is the case, the answer to the test in block 1706 will be "no" and suspension controller 808 proceeds to block 1712. In block 1712, suspension controller 808 opens lockup valve 1108, thereby removing the throttling previously provided in block 1708.

In the preferred embodiment, suspension controller 808 will only throttle lockup valve 1108 when the suspension approaches complete retraction compression. It may also be beneficial, however, to similarly throttle flow between cylinder 138 and accumulator 1104 for each suspension when the suspension approaches complete extension. This would occur if the skid steer vehicle chassis hit a bump, for example, and rose suddenly up in the air. With the chassis rising in the air, the suspensions could hyperextend and eventually would reach their downward mechanical limit. By throttling flow between accumulator 1104 and cylinder 138 during this hyperextension in the same manner that it is throttled in FIG. 17 during extreme compression of the suspension the sudden impact of the suspension reaching its fully extended position could be reduced or eliminated.

FIG. 18 illustrates the program performed by suspension controller 808 in its "ON" or operating mode whenever the operator has turned anti-roll control switch 1210 to its "ON" position. This program is executed during the every 10 millisecond polling loop performed by suspension controller 808. In step 1800, suspension controller 808 polls anti-roll control switch 1210 to determine its position. In block 1802, controller 808 determines whether that switch is on or off. If it is on, processing continues to block 1804. If it is off, however, controller 808 terminates this program.

In block 1804, suspension controller 808 calculates the speed difference between a wheel or wheels on the right hand side of the vehicle and a wheel or wheels on the left hand side of the vehicle to give an indication of the lateral (i.e. side-to-side) acceleration of the vehicle.

In the preferred embodiment, the right/left speed difference is calculated using values transmitted from the drive controller 814. These values are the actual or commanded swash plate position (i.e. the specific displacement) of pumps 106 and 108.

As explained above, pump 106 drives the hydraulic motors on the left side of the vehicle and pump 108 drives the hydraulic motors on the right side of the vehicle. As a result, the difference between the swash plate positions of pumps 106 and 108 is indicative of the difference between the velocities of the wheels on the left and the right side of the vehicles.

The difference in velocities are indicative of the lateral acceleration of the vehicle. The greater the difference in velocities, the faster the vehicle turns. The faster the turn, the greater the lateral acceleration. The swash plate positions (i.e. the specific displacements of pumps 106 and 108) can be either actual positions transmitted from pumps 106 and 108 to drive controller 814 and thence to suspension controller 808 over bus 812, or they can be commanded positions generated by drive controller 814, applied to pumps 106 and 108, and sent to suspension controller 808 over bus 812. In addition, speed signals from motor speed sensors 820 on opposite sides of the vehicle can be received by drive controller 814 and be transmitted over bus 812 to suspension controller 808. Motor speeds for motors on opposing sides of the vehicle can also be subtracted to provide data indicative of lateral acceleration in block 1804.

The swash plate position data are packetized in drive controller 814 and are transmitted over CAN bus 812 to suspension controller 808. Suspension controller 808 receives the pacitized swash plate positions and subtracts them to produce a value indicative of the difference in speed between the wheels on the right side of the vehicle and the wheels on the left side of the vehicle.

Once suspension controller 808 has determined the right/left speed difference, it then proceeds to block 1806 in which it compares this difference with a threshold speed difference. In the preferred embodiment, this threshold speed difference is about 2 mph.

In the event the speed difference is above this threshold, suspension controller 808 proceeds to block 1808 in which it closes the lockup valves 1108 on the outboard side of the vehicle. This throttling can be partial, in which case suspension controller 808 pulses lockup valves 1108 to reduce but not eliminate the flow rate through them, or it can be total, in which case suspension controller 808 closes lockup valves 1108 entirely. The particular degree to which outboard lockup valves 1108 are throttled depends upon the dynamics of the particular vehicle.

In the event the speed difference calculated in block _____ is not greater than the predetermined speed difference, processing continues to block 1810 in which the outboard lockup valves 1108 are "un-throttled".

In an alternative embodiment, controller 808 is configured to receive an acceleration signal from accelerometer 816 or data indicative of vehicle velocity from receiver 817 and determine lateral acceleration therefrom. This data indicative of lateral acceleration can be directly compared with a threshold lateral acceleration in place of the speed difference in blocks 1804 and 1806. In either case, the system is gathering data indicative of a lateral acceleration and is locking up or throttling outboard lock up valves 1108 if the data indicative is greater than a predetermined value.

FIG. 19 illustrates another program performed by suspension controller 808 based upon the setting of switches or buttons 614 when in the "ON" or operating mode. The steps illustrated in FIG. 19 are executed when the anti-dive control switch is turned on. As in the previous examples illustrated in FIGS. 13–18, these steps are executed whenever suspension controller 808 enters its every 10 millisecond polling loop.

In block 1900, suspension controller 808 polls the anti-dive control switch. In block 1902, suspension controller 808 examines the state of the anti-dive control switch and determines whether it is in the "ON" position. If the switch is not in the on position, no action is taken and the suspension controller 808 exits the loop as shown by flow control path 1904. If the anti-dive control switch is ON, however, suspension controller 808 proceeds to block 1906 in which controller 808 calculates a value fore-and-aft acceleration of the vehicle. In the preferred embodiment, controller 808 calculates the acceleration of the vehicle by determining the rate of change in the position of the swash plate of one or more of pumps 106 and 108. Since these pumps control the flow rate through the hydraulic motors driving the left and right hand sides of the vehicles, if the swash plate positions are reduced towards a neutral position (a position in which the output of the pumps is zero) the flow rate of fluid to the motors driven by pump 106 and 108 will be reduced and the vehicle will decelerate. As a result, swash plate position for both motors is indicative of the rotational velocity of the wheels on both sides of the vehicle. Hence, when the swash plate position is reduced towards a neutral position, the vehicle decelerates. In the preferred embodiment, drive controller 814 packetizes the swash plate positions of motors 106 and 108 and transmits those positions over serial communications bus 812. Suspension controller 808 (which is also connected to serial communications bus 812) receives this packetized data indicative of the swash plate positions of the pumps and further processes them. Drive controller 814 preferably transmits these swash plate positions at a rate of between 10 and 50 milliseconds. Suspension controller 808 is configured to receive this packetized data and process it in block 1906.

In the simplest embodiment, suspension controller 808 compares two successive values of the commanded swash plate position of either pump 106 or 108, calculates the difference between these two successive values, and thereby arrives at a value indicative of the acceleration or deceleration of the skid steer vehicle. Since in the preferred embodiment, drive controller 814 calculates the commanded swash plate positions of pumps 106 and 108 at the same predetermined interval (i.e. about every 10 milliseconds), the difference in magnitude between two successive swash plate positions indicative of the commanded change in velocity of the wheels driven by pumps 106 and 108 over that same time interval: the acceleration of the vehicle. Therefore, subtracting two successive swash plate positions provides an indication of the change in commanded velocity over that time interval and therefore an indication of the acceleration over that same time interval. Of course, it may be desirable to compare two swash plate positions not over a single time interval but over several time intervals.

In an alternative embodiment, the acceleration of the vehicle can be provided directly by receiver 817 and calculated either from two successive changes in position, or from accelerometer 816. In an alternative embodiment, suspension controller 808 could combine the successive swash plate positions of both pumps 106 and 108 to arrive at an average acceleration or deceleration based upon a combination of the swash plate positions of both pumps 106 and 108. For example, the velocity of the skid steer vehicle can be determined at a first time by adding the swash plate positions of both pumps 106 and 108. A subsequent average velocity can be calculated by adding subsequent swash plate positions of pumps 106 and 108. By subtracting the second of these combined values from the first of these combined values, an average change in the forward velocity of the skid steer vehicle over a predetermined time interval (i.e. acceleration) can be calculated by controller 808. This change in velocity divided by the time interval between the two successive measurements of velocity can be used as a value indicative of the acceleration or deceleration of the skid steer vehicle. Alternatively, controller 808 can receive actual wheel/motor velocity signals from speed sensors 820 over CAN bus 812 from drive controller 814 and calculate vehicle acceleration from those velocity signals. As another alternative, some pumps 106 and 108 are configured to transmit a signal indicative of the actual (not commanded) swash plate position or specific displacement. These signals can be used by controller 808 in place of the commanded swash plate positions generated by drive controller 814 and applied to pumps 106 and 108.

Once suspension controller 808 has calculated a value indicative of the acceleration or deceleration of the vehicle, processing continues to block 1908. In block 1908, suspension controller 808 compares the acceleration (or deceleration) to determine whether the vehicle is decelerating at a rate greater than a predetermined rate. In the preferred embodiment, this rate of negative acceleration is $-2$ m/s$^2$. This is approximately 0.25 g. If the vehicle has a negative acceleration greater than this rate, suspension controller 808 continues to block 1910.

In block 1910, suspension controller 808 throttles the lockup valves 1108 that control hydraulic fluid flow out of the left front and right front cylinders 138. This throttling of the two lockup valves 1108 can constitute either a partial or a full closing of those lockup valves, depending upon the dynamics of the skid steer vehicle. For example, if the front and rear tires are closely spaced together compared to the height and capacity of the bucket or other implement that may be raised above the vehicle, the forward lockup valves 1108 may be completely closed. This would lock the front suspensions. On the other hand, if the distance between the front and rear wheels of the skid steer loader are spaced rather widely apart and the bucket is limited in capacity or in height, there is less of an overhanging load in the bucket and front end dive due to the sudden deceleration may be countered merely by reducing the flow through the forward lockup valves 1108.

If the vehicle is not decelerating (negative acceleration) at the predetermined threshold rate as indicated in block 1908, suspension controller 808 continues to block 1912 in which the acceleration of the vehicle is compared with the second predetermined acceleration rate. If the acceleration is greater than this second acceleration rate (i.e. if the vehicle is increasing speed in a forward direction greater than the predetermined acceleration rate in block 1912, there will be a tendency for the vehicle to rise up on its front two suspensions and for the rear two suspensions to dive. If suspension controller 808 determines that this second acceleration threshold is exceeded, processing continues in block 1914 in which suspension controller 808 throttles the rear lockup valves 1108. The rear lockup valves are the lockup valves 1108 that control fluid flow from the left rear and right rear suspension cylinders 138 to accumulators 1104. Again, the rear lockup valves 1108 may be partially or completely closed depending upon the dynamics of the particular vehicle. For skid steer vehicles having a closely spaced front and rear wheels, or for skid steer vehicles having a large bucket capacity, it may be necessary to completely close the rear lockup valves 1108 thereby locking the two rear suspensions. Alternatively, if the front and rear wheels are not as closely spaced or if the bucket height or bucket capacity is not as high, it may be sufficient merely to reduce the flow rate through lockup valves 1108 and not to completely close them.

In the event that the acceleration of the skid steer vehicle is not greater than the second predetermined acceleration of about $2$ m/$\Delta^2$ provided in block 1912, the vehicle is neither accelerating or decelerating fast enough to cause a corresponding rear or front suspension drive, suspension controller 808 proceeds to execute block 1916. In this block, suspension controller 808 removes any throttling previously provided to either the forward lockup valves 1108 in block 1910 or the rear lockup valves in block 1914.

What is claimed is:

1. A skid steer vehicle, comprising:
   (A) a chassis having a left side and a right side;
   (B) an engine fixed to the chassis;
   (C) a first hydraulic fluid pump driven by the engine to provide hydraulic fluid under pressure;
   (D) a second hydraulic fluid pump driven by the engine to provide hydraulic fluid under pressure;
   (E) at least a first hydraulic motor in fluid communication with the first hydraulic fluid pump;
   (F) at least a second hydraulic motor in fluid communication with the second hydraulic fluid pump; and
   (G) left front and left rear suspensions mounted in a fore-and-aft arrangement on the left side of the chassis for pivotal movement with respect thereto, each left suspension including:
      (1) a left ground-engaging wheel extending from the left side of the chassis and rotationally coupled to the at least a first hydraulic motor to be driven in rotation thereby,
      (2) a left control arm assembly coupled to and between the left wheel and the chassis to pivot with respect to the chassis about a left control arm pivotal axis; and
   (H) right front and right rear suspensions mounted in a fore-and-aft arrangement on the right side of the chassis for pivotal movement with respect thereto, each right suspension including:
      (1) a right ground-engaging wheel extending from the right side of the chassis and rotationally coupled to the at least a second hydraulic motor to be driven in rotation thereby;
      (2) a right control arm coupled to and between the right wheel and the chassis to pivot with respect to the chassis about a right control arm pivotal axis; and
   wherein said at least a first hydraulic motor is coupled to both of the left side suspension wheels to drive the left side wheels at the same speed, and wherein said at least a second hydraulic motor is coupled to both of the right side suspension wheels to drive the right side wheels at the same speed.

2. The skid steer vehicle of claim 1, wherein each of the control arms of the left side suspensions and the right side suspensions is pivotally coupled to the chassis about a pivotal axis that is disposed closer to the center of gravity of the vehicle than wheel coupled to said each control arm.

3. The skid steer vehicle of claim 2, wherein the left control arm pivotal axis of the left front suspension and the right control arm pivotal axis of the right front suspension extend laterally with respect to the chassis and are located behind and parallel to the rotational axis of the left front and right front wheels, respectively.

4. The skid steer vehicle of claim 3, wherein the left front suspension further comprises:
   a left front spring coupled to the left front control arm at the left front control arms' pivotal axis to apply a torsional force thereto, wherein the left front spring is coupled to the chassis at a position closer to the center of gravity of the vehicle than the left front control arm; and
   a right front spring coupled to the right front control arm at the right front control arms' pivotal axis to apply a torsional force thereto, wherein the right front spring is coupled to the chassis at a position closer to the center of gravity of the vehicle than the left front control arm.

5. The skid steer vehicle of claim 4, wherein the left front spring and the right front spring are torsion bars extending laterally with respect to the chassis and behind the rotational axes of the left front suspension wheel and the right front suspension wheel.

6. The skid steer vehicle of claim 5, wherein the left rear suspension further comprises:
   a left rear spring coupled to the left rear control arm at the left rear control arms' pivotal axis to apply a torsional force thereto, wherein the left rear spring is coupled to the chassis at a position closer to the center of gravity of the vehicle than the left rear control arm; and a right rear spring coupled to the right rear control arm at the right rear control arms' pivotal axis to apply a torsional force thereto, wherein the right rear spring is coupled to the chassis at a position closer to the center of gravity of the vehicle than the left rear control arm.

7. A skid steer vehicle, comprising:

a chassis having a left side and a right side;

an engine mounted on the chassis;

first and second hydraulic pumps driven by the engine to provide first and second sources of hydraulic fluid under pressure; and four independent suspensions coupled to the chassis, each suspension including:
- a torsion bar having a longitudinal axis, a fixed end and a free end, wherein the fixed end is fixed with respect to the chassis;
- a control arm having first and second ends, wherein the first end is mounted to the chassis to pivot with respect to the chassis and further wherein the free end of the torsion bar is fixed to the first end of the control arm to pivot with respect to the chassis and thereby applying a torsional load to the torsion bar;
- a ground-engaging wheel rotationally mounted on the second end of the control arm to rotate with respect thereto; and
- a hydraulic motor fixed to the second end of the control arm and also coupled to the wheel to rotate the wheel with respect to the control arm.

8. The skid steer vehicle of claim 7, wherein two of the four suspensions are front suspensions, disposed one on each side of the chassis and two of the four suspensions are rear suspensions disposed one on each side of the chassis.

9. The skid steer vehicle of claim 8, wherein the control arms of the two front suspensions are coupled to the chassis on either side of the chassis in a central region thereof and extend forward toward the front of the vehicle, and further wherein the control arms of the two rear suspensions are coupled to the chassis on either side of the chassis in the central region thereof and extend backward toward the rear of the vehicle.

10. The skid steer vehicle of claim 9, wherein the longitudinal axes of the torsion bars front suspensions are generally parallel and coaxial and the longitudinal axes of torsion bars of the rear suspensions are generally are generally parallel and coaxial.

11. The skid steer loader of claim 10, wherein the torsion bar of each of the two front suspensions is fixed to the chassis at a point rearward of the rotational axis of its wheel, and further wherein the torsion bar of each of the two rear suspensions is fixed to the chassis at a point forward of the rotational axis of the wheels.

12. The skid steer loader of claim 11, wherein each suspension further comprises a reduction gear wheel hub that is mounted to the second end of the control arm and to which the wheel is fixed, the wheel hub being coupled to and driven by the hydraulic motor an including an integral reduction gear set to rotate the wheel at a velocity less than the rotational velocity of the hydraulic motor.

13. The skid steer loader of claim 12, wherein the control arm of each of the suspensions is comprised of at least two spaced apart steel plates extending generally perpendicular to the ground and defining a space therebetween in which the hydraulic motor is received and supported.

14. The skid steer loader of claim 13, wherein the first hydraulic pump is hydraulically connected to the two hydraulic motors of the suspensions disposed on the left side of the chassis in a first series circuit and further wherein the second hydraulic pump is hydraulically connected to the two hydraulic motors of the suspensions disposed on the right side of the chassis in a second series circuit.

15. A skid steer vehicle comprising:

a chassis having a left side and a right side;

an engine mounted on the chassis;

two independent suspensions disposed at the front of the vehicle, one on the left side of the chassis and one on the right side of the chassis, the suspensions including:
- a fore-and-aft oriented forward control arm that is pivotally coupled to the vehicle at an after end of the forward control arm;
- a ground-engaging forward wheel coupled to a forward end of the forward control arm and having a rotational axis about which the forward wheel rotates to convey the vehicle over the ground; and
- a forward torsion bar that is coupled to the after end of the forward control arm at a location rearward of the rotational axis of the forward wheel, the torsion bar extending laterally inward from the forward control arm generally toward the center of the vehicle to a forward suspension anchor point at which it is fixed to the chassis of the vehicle, wherein the forward suspensions anchor point is located to the rear of the forward wheel's rotational axis and laterally inward from the forward wheel itself; and two independent suspensions disposed at the rear of the vehicle, one on the left side of the chassis and one on the right side of the chassis, the suspensions including:
- a fore-and-aft oriented rear control arm that is pivotally coupled to the vehicle at a forward end of the rear control arm;
- a ground-engaging rear wheel coupled to a rearward end of the rear control arm and having a rotational axis about which the rear wheel rotates to convey the vehicle over the ground; and
- a torsion bar that is coupled to the forward end of the rear control arm at a location forward of the rotational axis of the rear wheel, the torsion bar extending laterally inward from the rear control arm generally toward the center of the vehicle to a rear suspension anchor point at which it is fixed to the chassis of the vehicle, wherein the rear suspension anchor point is located forward of the rear wheel's rotational axis and laterally inward from the rear wheel itself.

16. The skid steer vehicle of claim 15, wherein each torsion bar of the four suspensions extends generally perpendicular to the longitudinal extent of the control arm to which it is coupled.

17. The skid steer vehicle of claim 16, wherein each of the four control arms extends horizontally.

18. The skid steer vehicle of claim 17, wherein the center of each wheel is at the same height above the ground as the pivot point of the control arm to which it is coupled when the vehicle is stationary.

19. The skid steer vehicle of claim 18, wherein each control arm includes a pair of spaced-apart steel plates, each plate extending both in a vertical direction and in a fore-and aft direction.

20. The skid steer vehicle of claim 19, wherein each of the two front independent suspensions includes a fluid-filled shock absorbing element that is coupled to and between the forward end of each suspension's control arm and the chassis.

21. The skid steer vehicle of claim 20, wherein each of the two rear independent suspensions includes a fluid-filled shock-absorbing element that is coupled to and between the rearward end of each suspension's control arm and the chassis.

22. The skid steer vehicle of claim 21 wherein each of the two front independent suspensions includes a hydraulic motor that is fixed to the forward end of the control arm of said each front suspension.

23. The skid steer vehicle of claim 22 wherein each of the two rear independent suspensions includes a hydraulic motor that is fixed to the rear end of the control arm of said each rear suspension.

24. A skid steer vehicle, comprising:
   a chassis having a left side, a right side, and a center of gravity;
   an internal combustion engine mounted on the chassis; and
   left and right front suspensions pivotally coupled to and extending from the left and right sides of the chassis, respectively, wherein each front suspension includes:
      a front wheel;
      a front control arm coupled to the front wheel, and pivotally coupled to the chassis at least one pivot point defining a control arm to chassis pivotal axis, wherein the pivotal axis is disposed between the center of gravity of the vehicle and the front wheel; and
      a spring element coupled to and between the front control arm and the chassis to apply a torque to the front control arm, the spring element being fixed to the chassis at a point closer to the center of gravity of the vehicle than the pivot point of the front control arm.

25. The skid steer vehicle of claim 1, wherein the control arm to chassis pivotal axes extend laterally with respect to the chassis.

26. The skid steer vehicle of claim 25, wherein the spring element is a torsion bar.

27. The skid steer vehicle of claim 26, wherein the torsion bar is coaxial with the front control arm to chassis pivotal axis.

28. The skid steer vehicle of claim 27 wherein the front control arm is an elongate member extending fore-and-aft with respect to the chassis.

29. The skid steer vehicle of claim 28, wherein the front control arm has a forward end and an after end, the forward end coupled to the front wheel and the after end pivotally coupled to the chassis.

30. The skid steer vehicle of claim 29, wherein the front wheel is coupled to the forward end of the front control arm to rotate with respect to the front control arm.

31. The skid steer vehicle of claim 26, further comprising:
   a first hydraulic pump coupled to the engine to provide hydraulic fluid under pressure;
   at least one hydraulic motor coupled to the first pump and to the left front wheel to rotate the left front wheel;
   a second hydraulic pump coupled to the engine to provide hydraulic fluid under pressure; and
   at least a second hydraulic motor coupled to the second pump and to the right front wheel to rotate the right front wheel.

32. The skid steer vehicle of claim 31, further comprising left and right rear suspensions pivotally coupled to and extending from the left and right sides of the chassis, respectively, wherein each rear suspension includes:
   a rear wheel; and
   a rear control arm coupled to the wheel, and pivotally coupled to the chassis at at least one pivot point defining a control arm to chassis pivotal axis, wherein the pivotal axis is disposed between the center of gravity of the vehicle and the rear wheel; and
   wherein the at least one hydraulic motor is coupled to the left rear wheel to rotate the left rear wheel at the same velocity as it rotates the left front wheel, and wherein the at least a second hydraulic motor is coupled to the right rear wheel to rotate the right rear wheel at the same velocity as it rotates the right front wheel.

33. The skid steer vehicle of claim 32, wherein each rear suspension further includes a spring element coupled to and between the rear control arm and the chassis to apply a torque to the control arm, the spring element being fixed to the chassis at a point closer to the center of gravity of the vehicle than the pivot point of the rear control arm.

34. The skid steer loader of claim 33, wherein the center of gravity is determined with the vehicle unloaded.

* * * * *